US011619858B2

(12) United States Patent
Nomura et al.

(10) Patent No.: US 11,619,858 B2
(45) Date of Patent: Apr. 4, 2023

(54) OPTICAL DEVICE AND OPTICAL DETECTION SYSTEM

(71) Applicant: Panasonic Intellectual Property Management Co., Ltd., Osaka (JP)

(72) Inventors: Takaiki Nomura, Osaka (JP); Hiroyuki Takagi, Osaka (JP); Masahiko Tsukuda, Osaka (JP); Yasuhisa Inada, Osaka (JP); Taku Hirasawa, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/160,908

(22) Filed: Jan. 28, 2021

(65) Prior Publication Data

US 2021/0149136 A1 May 20, 2021

Related U.S. Application Data

(63) Continuation of application No. PCT/JP2019/024407, filed on Jun. 20, 2019.

(30) Foreign Application Priority Data

Sep. 19, 2018 (JP) .............................. JP2018-175096

(51) Int. Cl.
*G02F 1/295* (2006.01)
*G02B 6/12* (2006.01)
(Continued)

(52) U.S. Cl.
CPC ............ *G02F 1/2955* (2013.01); *G01S 7/481* (2013.01); *G01S 7/4817* (2013.01); *G01S 17/32* (2013.01);
(Continued)

(58) Field of Classification Search
None
See application file for complete search history.

(56) References Cited

U.S. PATENT DOCUMENTS

| 5,454,055 A | 9/1995 | Kragl et al. |
| 10,877,215 B2 * | 12/2020 | Hashiya ................. G02B 26/06 |

(Continued)

FOREIGN PATENT DOCUMENTS

| EP | 3287841 A1 * | 2/2018 | .......... G02F 1/2955 |
| JP | 3-110527 | 5/1991 | |

(Continued)

OTHER PUBLICATIONS

International Search Report of PCT application No. PCT/JP2019/024407 dated Jul. 16, 2019.

(Continued)

*Primary Examiner* — Michelle R Connelly
(74) *Attorney, Agent, or Firm* — McDermott Will & Emery LLP

(57) ABSTRACT

An optical device includes a first substrate, a second substrate, a plurality of separation walls, one or more optical waveguides, and one or more spacers. The first substrate has a surface which extends in a first direction and a second direction intersecting the first direction. The second substrate faces the first substrate. The plurality of separation walls are positioned between the first substrate and the second substrate and extend in the first direction. The one or more optical waveguides are positioned between the first substrate and the second substrate and include one or more dielectric members which are positioned between the plurality of separation walls and which extend in the first direction. The one or more spacers are directly or indirectly (Continued)

sandwiched between the first substrate and the second substrate and positioned around the one or more optical waveguides.

20 Claims, 18 Drawing Sheets

(51) Int. Cl.
    *G02B 27/00*     (2006.01)
    *G02F 1/035*     (2006.01)
    *G02F 1/13*     (2006.01)
    *G02F 1/1339*     (2006.01)
    *G02F 1/29*     (2006.01)
    *G02B 6/122*     (2006.01)
    *G02B 6/124*     (2006.01)
    *G01S 7/481*     (2006.01)
    *G01S 17/32*     (2020.01)

(52) U.S. Cl.
    CPC .......... *G02B 6/12* (2013.01); *G02B 6/12004* (2013.01); *G02B 27/0087* (2013.01); *G02F 1/035* (2013.01); *G02F 1/13* (2013.01); *G02F 1/1326* (2013.01); *G02F 1/1339* (2013.01); *G02F 1/13394* (2013.01); *G02F 1/292* (2013.01); *G02F 1/295* (2013.01); *G02B 6/122* (2013.01); *G02B 6/124* (2013.01); *G02B 2006/121* (2013.01); *G02B 2006/12104* (2013.01); *G02B 2006/12107* (2013.01); *G02B 2006/12138* (2013.01); *G02F 2201/06* (2013.01); *G02F 2201/066* (2013.01); *G02F 2201/302* (2013.01)

(56) References Cited

U.S. PATENT DOCUMENTS

| | | | |
|---|---|---|---|
| 10,901,293 B1* | 1/2021 | Guo | G01S 7/4817 |
| 11,092,691 B2* | 8/2021 | Shim | G01S 17/42 |
| 2004/0005111 A1* | 1/2004 | Ishikawa | G02B 6/3582 |
| | | | 385/16 |
| 2016/0026019 A1 | 1/2016 | Choi et al. | |
| 2018/0224709 A1 | 8/2018 | Inada et al. | |
| 2018/0372951 A1 | 12/2018 | Hashiya et al. | |
| 2019/0033574 A1 | 1/2019 | Inada et al. | |
| 2021/0325762 A1* | 10/2021 | Lee | G02F 1/295 |
| 2022/0011404 A1* | 1/2022 | Nomura | G02F 1/295 |
| 2022/0037786 A1* | 2/2022 | Lipson | G01S 17/42 |

FOREIGN PATENT DOCUMENTS

| | | | | |
|---|---|---|---|---|
| JP | 11-064859 | 3/1999 | | |
| JP | 2002-048986 | 2/2002 | | |
| JP | 2005-266254 | 9/2005 | | |
| JP | 2008-225082 | 9/2008 | | |
| JP | 2008-233242 | 10/2008 | | |
| JP | 2010-002664 | 1/2010 | | |
| JP | 2013-016591 | 1/2013 | | |
| JP | 2016-508235 | 3/2016 | | |
| JP | 2018-128663 | 8/2018 | | |
| JP | 2018128663 A * | 8/2018 | ............ | G02F 1/295 |
| JP | 2019-028438 | 2/2019 | | |
| WO | 2013/168266 | 11/2013 | | |
| WO | 2014/110017 | 7/2014 | | |
| WO | 2018/061515 | 4/2018 | | |

OTHER PUBLICATIONS

International Search Report of PCT application No. PCT/JP2020/004775 dated Mar. 31, 2020.
Extended European Search Report dated Apr. 25, 2022 for the related European Patent Application No. 20794084.2.

* cited by examiner

OPTICAL DEVICE AND OPTICAL DETECTION SYSTEM

BACKGROUND

1. Technical Field

The present disclosure relates to an optical device and an optical detection system.

2. Description of the Related Art

Heretofore, various devices that can optically scan a space have been proposed.

International Publication No. 2013/168266 discloses a configuration that enables optical scanning by using a drive device that rotates a mirror.

Japanese Unexamined Patent Application Publication (Translation of PCT Application) No. 2016-508235 discloses an optical phased array that includes a plurality of nanophotonic antenna elements arranged in a two-dimensional manner. The antenna elements are optically coupled to respective variable optical delay lines (that is, phase shifters). In this optical phased array, coherent light beams are guided to the respective antenna elements by waveguides, and the phases of the light beams are shifted by the phase shifters. Thus, an amplitude distribution of a far-field radiation pattern can be changed.

Japanese Unexamined Patent Application Publication No. 2013-16591 discloses an optical deflection element that includes a waveguide, a light incidence aperture, and a light emission aperture. The waveguide includes an optical waveguide layer through which light is guided and first distributed Bragg reflectors formed on an upper surface and a lower surface of the optical waveguide layer. Light is incident to the waveguide through the light incidence aperture. The light emitting aperture is formed on a surface of the waveguide for emitting the light having been incident through the light incidence aperture and guided through the waveguide.

SUMMARY

One non-limiting and exemplary embodiment provides a novel optical device that can realize optical scanning with a comparatively simple structure.

In one general aspect, the techniques disclosed here feature an optical device that includes a first substrate, a second substrate, a plurality of separation walls, one or more first optical waveguides, and one or more spacers. The first substrate has a surface which extends in a first direction and a second direction intersecting the first direction. The second substrate faces the first substrate. The plurality of separation walls are positioned between the first substrate and the second substrate and extend in the first direction. The one or more first optical waveguides are positioned between the first substrate and the second substrate and include one or more dielectric members which are positioned between the plurality of separation walls and which extend in the first direction. The one or more spacers are directly or indirectly sandwiched between the first substrate and the second substrate and positioned around the one or more first optical waveguides.

A comprehensive or specific embodiment may also be realized by a device, a system, a method, or any combination of these.

According to the non-limiting exemplary embodiment, one-dimensional or two-dimensional optical scanning can be realized with a comparatively simple structure.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
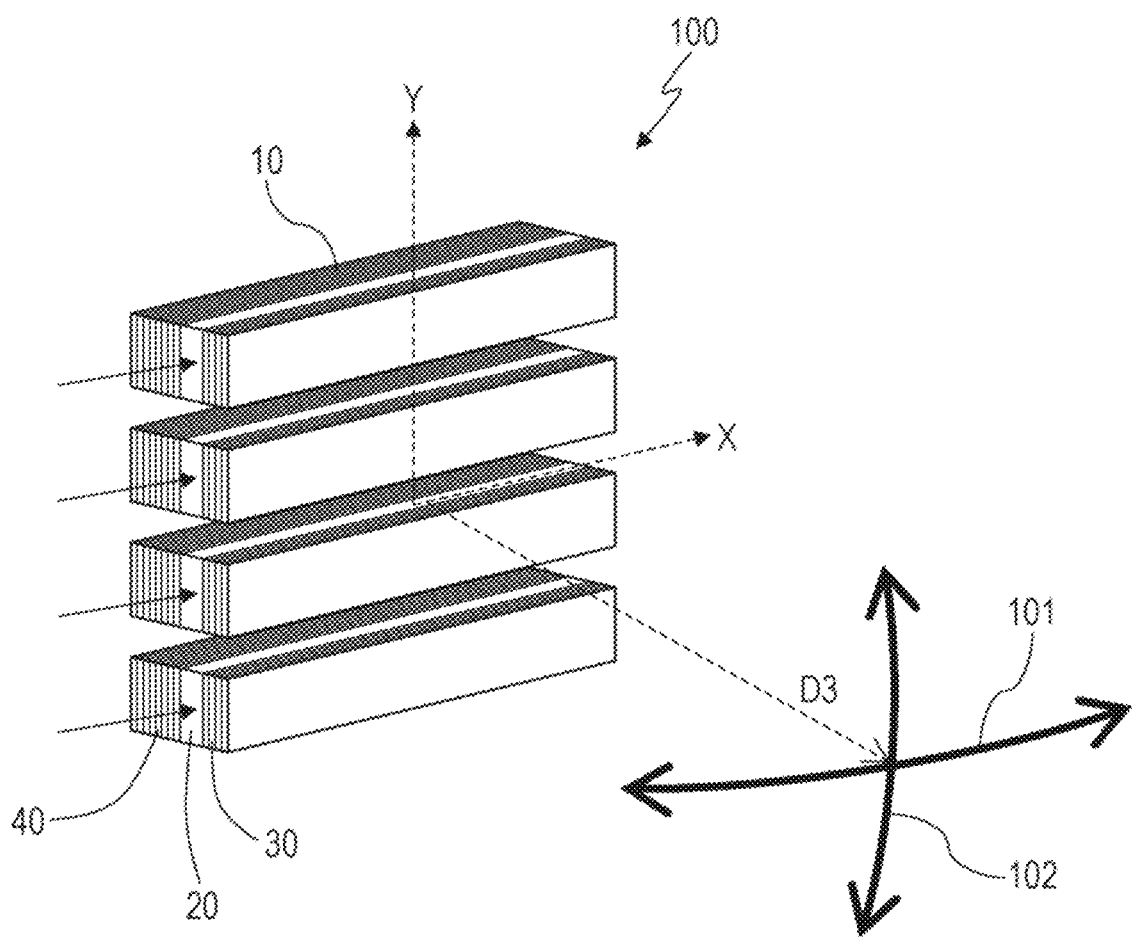
FIG. 1 is a perspective view schematically illustrating a configuration of an optical scanning device according to an exemplary embodiment of the present disclosure.

Before an embodiment of the present disclosure is described, finding that serves as the basis of the present disclosure is described.

The inventors found that there is a problem with optical scanning devices of related art in that it is difficult to optically scan a space without making the configuration of the devices complex.

For example, techniques disclosed in International Publication No. 2013/168266 require a drive device that rotates a mirror. For this reason, there are problems in that the device has a complex configuration and is not robust against vibration.

With an optical phased array described in Japanese Unexamined Patent Application Publication (Translation of PCT Application) No. 2016-508235, it is required to branch light so as to introduce the light into a plurality of column waveguides and a plurality of row waveguides, and guide the light to a plurality of antenna elements arranged in a two-dimensional manner. For this reason, wiring for the waveguides for guiding the light is significantly complex. In addition, it is impossible to enlarge a range of two-dimensional scanning. Furthermore, for changing in a two-dimensional manner an amplitude distribution of emission light in the far field, it is required to respectively connect phase shifters to the plurality of antenna elements arranged in a two-dimensional manner and attach wires for phase control to the phase shifters. Thus, the phases of the light incident to the plurality of different antenna elements arranged in a two-dimensional manner are changed by different amounts. Accordingly, the configuration of the elements is very complex.

The inventors focused attention on the above-described problems of the related art and studied configurations to address these problems. The inventors have found that the above-described problems are successfully addressed by using a waveguide element that includes a pair of mirrors facing each other and an optical waveguide layer sandwiched between the mirrors. One of the pair of mirrors in the waveguide element has a higher light transmittance than that of the other, thereby allowing part of the light propagating through the optical waveguide layer to be emitted to the outside. As will be described, the direction of the emitted light (or the emission angle) can be changed by adjusting the refractive index or the thickness of the optical waveguide layer or the wavelength of the light input to the optical waveguide layer. More specifically, the component of the wave vector of an emission light in a direction along the longitudinal direction of the optical waveguide layer can be changed by changing the refractive index, the thickness, or the wavelength. Thus, one-dimensional scanning is realized.

Furthermore, when an array of a plurality of the waveguide elements is used, two-dimensional scanning can be realized. More specifically, when an appropriate phase difference is given to portions of the light respectively supplied to the plurality of waveguide elements and the phase difference is adjusted, it is possible to change a direction in which the portions of the light respectively emitted from the plurality of waveguide elements intensify each other. A change in the phase difference changes the component of the wave vector of emission light in a direction intersecting the direction along the longitudinal direction of the optical waveguide layer. Thus, two-dimensional scanning can be realized. Even when the two-dimensional scanning is performed, it is not required to vary the amount by which the refractive index, the thickness, or the wavelength of the light among a plurality of optical waveguide layers is changed. That is, the two-dimensional scanning can be performed by giving an appropriate phase difference to the portions of the light supplied to the plurality of optical waveguide layers and synchronously changing at least one of the refractive index, the thickness, and the wavelength of the plurality of optical waveguide layers by the same amount. As described above, according to the embodiment of the present disclosure, two-dimensional optical scanning can be realized with a comparatively simple configuration.

Herein, "at least one of the refractive index, the thickness, and the wavelength" means at least one selected from a group consisting of the refractive index of the optical waveguide layer, the thickness of the optical waveguide layer, and the wavelength input to the optical waveguide layer. For changing a light emission direction, only one of the refractive index, the thickness, and the wavelength may be controlled. Alternatively, any two or all of the three parameters may be controlled so as to change the light emission direction. In the following embodiment, instead of or in addition to the control of the refractive index or the thickness, the wavelength of the light input to the optical waveguide layer may be controlled.

The above-described basic principles can be applied not only to applications for emitting light but also similarly to applications for receiving an optical signal. The direction of a light that can be received can be changed in a one-dimensional manner when at least one of the refractive index, the thickness, and the wavelength is changed. Furthermore, the direction of the light that can be received can be changed in a two-dimensional manner when the phase difference of the portions of the light is changed with a plurality of phase shifters respectively connected to the plurality of waveguide elements arranged in a single direction.

An optical scanning device and an optical reception device according to the embodiment of the present disclosure can be used as, for example, an antenna of an optical detection system such as a light detection and ranging (LiDAR) system. Since the LiDAR system, which uses an electromagnetic wave of short wavelength (visible light, infrared radiation, or ultraviolet radiation) compared to a radar system using a radio wave such as a millimeter wave, can detect a distance distribution of an object with high resolution. Such a LiDAR system can be mounted on, for example, movable bodies such as automobiles, unmanned aerial vehicles (UAVs, so-called drones), and automated guided vehicles (AGVs) so as to be used as one of collision avoidance techniques. Herein, the optical scanning device and the optical reception device may be collectively referred to as "optical devices". Also, a device used for the optical scanning device or the optical reception device may be referred to as an "optical device".

Example of a Configuration of the Optical Scanning Device

As an example, a configuration of the optical scanning device that performs two-dimensional scanning will be described below. Description further in detail than required may be omitted. For example, detailed description on well known matters and redundant description on the substantially same configurations may be omitted. The reason for this is to avoid unnecessary redundancy in the following description and allow those skilled in the art to easily understand the description. The inventors provide the accompanying drawings and the following description to enable those skilled in the art to sufficiently understand the present disclosure and do not intend to limit the subject matters described in the claims by the accompanying drawings or the description. In the following description, the same or similar elements are denoted by the same reference signs.

In the present disclosure, "light" means not only visible light (having a wavelength of about 400 to 700 nm) but also ultraviolet radiation (having a wavelength of about 10 to 400 nm) and infrared radiation (having a wavelength of about 700 nm to 1 mm). In the present specification, the ultraviolet radiation may be referred to as "ultraviolet light" and the infrared radiation may be referred to as "infrared light".

In the present disclosure, optical "scanning" means changing of the direction of the light. The term "One-dimensional scanning" means linearly changing the direction of the light into a direction intersecting the direction of the light. The term "two-dimensional scanning" means changing the direction of the light in a two-dimensional manner in a plane intersecting the direction of the light.

FIG. 1 is a perspective view schematically illustrating a configuration of an optical scanning device 100 according to an exemplary embodiment of the present disclosure. The optical scanning device 100 includes a waveguide array that includes a plurality of waveguide elements 10. The plurality of waveguide elements 10 each have a shape extending in a first direction (X direction in FIG. 1). The plurality of waveguide elements 10 are regularly arranged in a second direction (Y direction in FIG. 1) intersecting the first direction. The plurality of waveguide elements 10 emit light in a third direction D3 intersecting a virtual plane parallel to the first direction and the second direction while causing the light to propagate in the first direction. Although the first direction (X direction) and the second direction (Y direction) are perpendicular to each other according to the present embodiment, the first direction and the second direction are not necessarily perpendicular to each other. Although the plurality of waveguide elements 10 are equally spaced in the Y direction according to the present embodiment, the spaces between the waveguide elements 10 are not necessarily equal to each other.

The directions of structures illustrated in the drawings of the present disclosure are set in consideration of ease of description and do not limit in any way the directions when the embodiment of the present disclosure is actually implemented. Neither the shapes or the sizes of the entireties or parts of the structures illustrated in the drawings limit the actual shapes or sizes.

Each of the plurality of waveguide elements 10 includes a first mirror 30 and a second mirror 40 that face each other (each of these may be simply referred to as a "mirror" hereafter). The waveguide element 10 also includes an optical waveguide layer 20 positioned between the mirror 30 and the mirror 40. The mirror 30 and the mirror 40 each have a reflection surface that intersects the third direction D3 at an interface with the optical waveguide layer 20. The mirror 30, the mirror 40, and the optical waveguide layer 20 have a shape extending in the first direction (X direction).

As will be described later, a plurality of the first mirrors 30 of the plurality of waveguide elements 10 may be a plurality of parts of an integrally configured mirror. Likewise, a plurality of the second mirrors 40 of the plurality of waveguide elements 10 may be a plurality of parts of an integrally configured mirror. Also, a plurality of the optical waveguide layers 20 of the plurality of waveguide elements 10 may be a plurality of parts of an integrally configured optical waveguide layer. A plurality of waveguides can be formed when at least (1) each of the first mirrors 30 is configured separately from the other first mirrors 30, (2) each of the second mirrors 40 is configured separately from the other second mirrors 40, or (3) each of the optical waveguide layers 20 is configured separately from other optical waveguide layers 20. The term "configured separately" is not only limited to separation by physical spaces but may instead be separation with a material having a different refractive index sandwiched therebetween.

The reflection surface of the first mirror 30 faces the reflection surface of the second mirror 40 such that the first mirror 30 and the second mirror 40 are substantially parallel to each other. Out of the two mirrors 30 and 40, at least the first mirror 30 has a characteristic with which part of the light propagating through the optical waveguide layer 20 is transmitted. In other words, for this light, the first mirror 30 has a higher light transmittance than that of the second mirror 40. Thus, the part of the light propagating through the optical waveguide layer 20 is emitted to the outside through the first mirror 30. Such mirrors 30 and 40 can be, for example, multilayer film mirrors formed of multilayer films (also referred to as "multilayer reflection films") of a dielectric.

Two-dimensional optical scanning can be realized by controlling the phase of the light input to each of the waveguide elements 10, and further, simultaneously changing, in a synchronous manner, the refractive index or the thickness of the optical waveguide layer 20 in the waveguide element 10 or the wavelength of the light input to the optical waveguide layer 20.

The inventors have analyzed the principles of operation of the waveguide elements 10 to realize such two-dimensional scanning. Based on the result of the analysis, the two-dimensional optical scanning is successfully realized by synchronously driving the plurality of waveguide elements 10.

As illustrated in FIG. 1, when the light is input to each of the waveguide elements 10, the light is emitted through an emission surface of the waveguide element 10. The emission surface is positioned on the opposite side to the reflection surface of the first mirror 30. The direction D3 of the emission light depends on the refractive index and the thickness of the optical waveguide layer and the wavelength of the light. According to the present embodiment, at least one of the refractive index, the thickness, and the wavelength of the optical waveguide layers is synchronously controlled to make the directions of the portions of the light emitted from the waveguide elements 10 substantially the same. Thus, the X-direction components of the wave vectors of the light emitted from the plurality of waveguide elements 10 can be changed. In other words, the direction D3 of the emission light can be changed in a direction 101 illustrated in FIG. 1.

Furthermore, since the portions of the light emitted from the plurality of waveguide elements 10 are in the same direction, the portions of the emission light interfere with each other. The direction in which the portions of the light intensify each other by the interference can be changed by controlling the phases of the portions of the light emitted from the waveguide elements 10. For example, when the plurality of waveguide elements 10 of the same size are equally spaced in the Y direction, the portions of the light having different phases from each other by a fixed amount are input to the plurality of waveguide elements 10. When the phase difference is changed, the Y-direction components of the wave vectors of the emission light can be changed. In other words, the direction D3 in which the portions of the emission light intensify each other by the interference can be changed in a direction 102 illustrated in FIG. 1 by changing the phase difference of the portions of the light introduced into plurality of the waveguide elements 10. Thus, the two-dimensional optical scanning can be realized.

Hereafter, the principles of operation of the optical scanning device 100 is described.

The Principles of Operation of the Waveguide Elements

Figure 2:
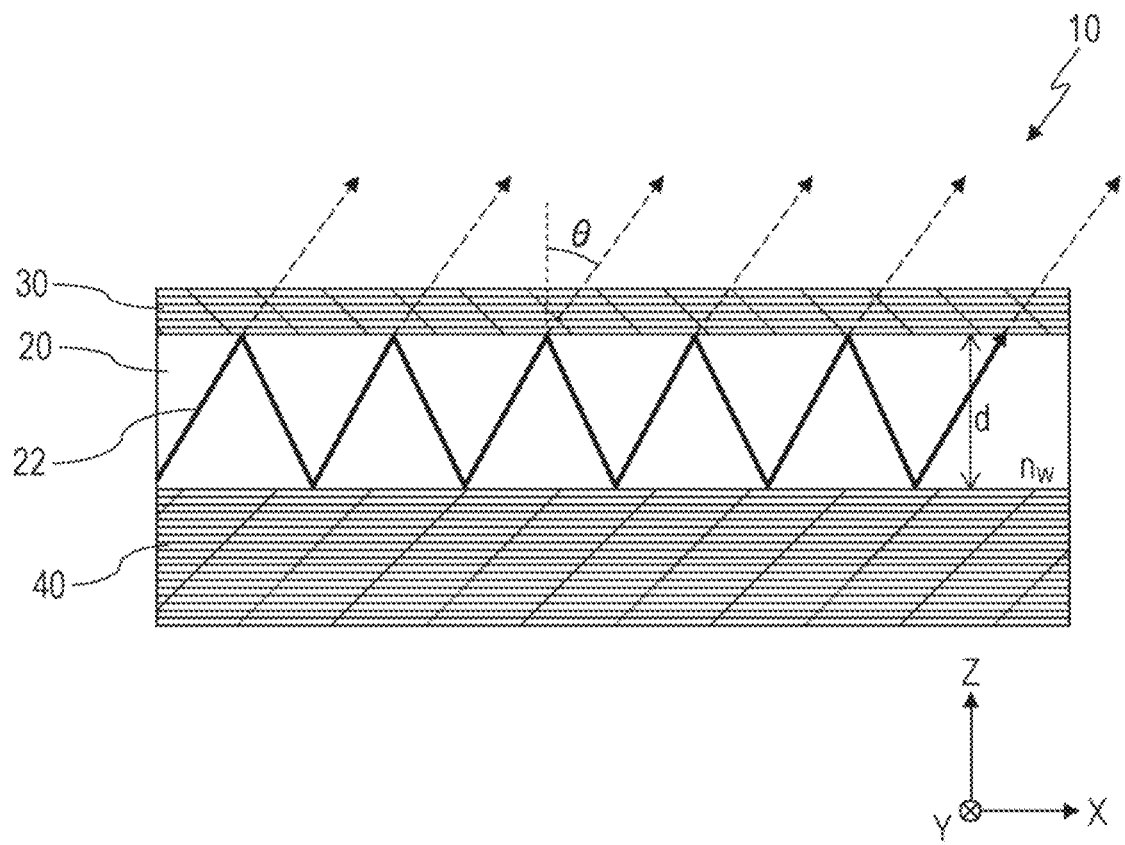
FIG. 2 schematically illustrates an example of the sectional structure of one of waveguide elements and an example of light propagating through the waveguide element.

FIG. 2 schematically illustrates an example of the sectional structure of one of the waveguide elements 10 and an example of the light propagating through the waveguide element. In FIG. 2, a direction perpendicular to the X direction and the Y direction illustrated in FIG. 1 is defined as the Z direction, and the section of the waveguide element 10 parallel to the XZ plane is schematically illustrated. In the waveguide element 10, a pair of the mirror 30 and the mirror 40 are disposed such that the optical waveguide layer 20 is sandwiched between the mirror 30 and mirror 40. Light 22 introduced from one end of the optical waveguide layer 20 in the X direction propagates through the optical waveguide layer 20 while being repeatedly reflected by the first mirror 30 provided on an upper surface of the optical waveguide layer 20 (surface on the upper side in FIG. 2) and the second mirror 40 provided on a lower surface (surface on the lower side in FIG. 2) of the optical waveguide layer 20. The light transmittance of the first mirror 30 is higher than the light transmittance of the second mirror 40. Thus, part of the light can be mainly output from the first mirror 30.

In the case of a waveguide such as a normal optical fiber, light propagates along the waveguide while total reflection is repeated. In contrast, in the case of the waveguide element 10 according to the present embodiment, the light propagates while being repeatedly reflected by the mirrors 30 and 40 disposed above and below the optical waveguide layer 20. Thus, a propagation angle of the light is not limited. Here, the propagation angle of the light means an incidence angle upon the interface between the mirror 30 or mirror 40 and the optical waveguide layer 20. Light incident upon the mirror 30 or mirror 40 at an angle closer to a perpendicular angle can also propagate. That is, light incident upon the interface at a smaller angle than the critical angle of the total reflection can propagate. Thus, the group velocity of the light in a propagating direction of the light significantly reduces compared to the velocity of the light in free space. Thus, the waveguide element 10 has the characteristics with which the conditions for propagation of the light significantly change due to changes in the wavelength of the light, the thickness of the optical waveguide layer 20, and the refractive index of the optical waveguide layer 20. Such a waveguide is referred to as a "reflection waveguide" or "slow-light waveguide".

An emission angle θ of the light emitted from the waveguide element 10 into air is represented by the following Expression 1.

$$\sin\theta = \sqrt{n_w^2 - \left(\frac{m\lambda}{2d}\right)^2} \quad (1)$$

As can be understood from Expression 1, the light emission direction can be changed by changing any of a wavelength in air λ, a refractive index $n_w$ of the optical waveguide layer 20, and a thickness d of the optical waveguide layer 20.

For example, when $n_w$=2, d=387 nm, λ=1550 nm, and m=1, the emission angle is 0°. When the refractive index is changed from this state into $n_w$=2.2, the emission angle is changed into about 66°. When the thickness is changed into d=420 nm with the refractive index fixed, the emission angle is changed into about 51°. When the wavelength is changed into λ=1500 nm with the refractive index and the thickness fixed, the emission angle is changed into about 30°. In this way, when any of the wavelength λ of the light, the refractive index $n_w$ of the optical waveguide layer 20, and the thickness d of the optical waveguide layer 20 is changed, the light emission direction can be significantly changed.

Accordingly, the optical scanning device 100 according to the embodiment of the present disclosure controls the light emission direction by controlling at least one of the wavelength λ of the light input to the optical waveguide layer 20, the refractive index $n_w$ of the optical waveguide layer 20, and the thickness d of the optical waveguide layer 20. The wavelength λ of the light may be maintained in a fixed value without changing during operation. In this case, optical scanning can be realized with a simpler configuration. The wavelength λ is not particularly limited. For example, the wavelength λ can be included in a wavelength region of 400 to 1100 nm (from visible light to near infrared light) for which a high detection sensitivity can be obtained by a photodetector or an image sensor that detects light by absorbing the light with usual silicon (Si). In another example, the wavelength λ can be included in a wavelength region of near infrared light of 1260 to 1625 nm with which transmission losses are comparatively small in an optical fiber or an Si waveguide. These wavelength ranges are examples. The wavelength region of the light in use is not limited to a wavelength region of visible light or infrared light and may be a wavelength region of, for example, ultraviolet light.

For changing the direction of the emission light, the optical scanning device 100 can include a first adjustment element that changes at least one of the refractive index, the thickness, and the wavelength of the optical waveguide layer 20 in each of the waveguide elements 10.

As described above, when the waveguide element 10 is used, the light emission direction can be significantly changed by changing at least one of the refractive index $n_w$, the thickness d, and the wavelength λ of the optical waveguide layer 20. Thus, the emission direction of the light emitted from the mirror 30 can be changed into a direction along the waveguide element 10. When at least one waveguide element 10 is used, such one-dimensional scanning can be realized.

For adjustment of at least part of the refractive index of the optical waveguide layer 20, the optical waveguide layer 20 may include a liquid crystal material or an electrooptic material. The optical waveguide layer 20 can be sandwiched between a pair of electrodes. When a voltage is applied to the pair of electrodes, the refractive index of the optical waveguide layer 20 can be changed.

For adjustment of the thickness of the optical waveguide layer 20, for example, at least one actuator may be connected to at least one of the first mirror 30 and the second mirror 40. When the distance between the first mirror 30 and the second mirror 40 is changed by using the at least one actuator, the thickness of the optical waveguide layer 20 can be changed. When the optical waveguide layer 20 is formed of a liquid, the thickness of the optical waveguide layer 20 can be easily changed.

The Principles of Operation of Two-Dimensional Scanning

In the waveguide array in which the plurality of waveguide elements 10 are arranged in a single direction, the light emission direction can be changed due to interference of the portions of the light emitted from the respective waveguide elements 10. The light emission direction can be changed by adjusting the phases of the portions of the light supplied to the respective waveguide elements 10. The principles of this are described below.

Figure 3A:
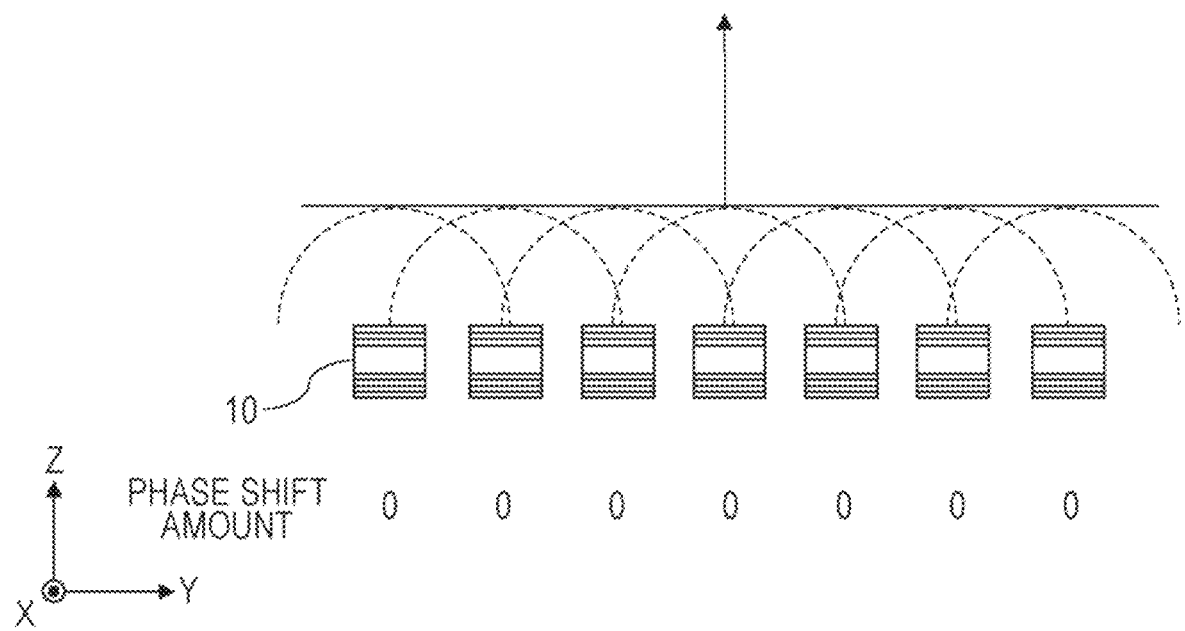
FIG. 3A illustrates the section of a waveguide array from which light is emitted in a direction perpendicular to an emission surface of the waveguide array.

FIG. 3A illustrates the section of the waveguide array from which the light is emitted in a direction perpendicular to the emission surface of the waveguide array. In FIG. 3A, phase shift amounts of the portions of the light propagating through the respective waveguide elements 10 are also illustrated. Here, the phase shift amounts are values with reference to the phase of a portion of the light propagating through the waveguide element 10 at the left end. The waveguide array according to the present embodiment includes the plurality of equally spaced waveguide elements 10. In FIG. 3A, arches in broken lines indicate wavefronts of the portions of the light emitted from the waveguide elements 10. A straight line indicates a wavefront formed by interference of the portions of the light. An arrow indicates the direction of the light (that is, the direction of the wave vector) emitted from the waveguide array. In the example of FIG. 3A, the phases of the portions of the light propagating through the optical waveguide layers 20 of all the waveguide elements 10 are the same. In this case, the light is emitted in a direction (Z direction) that is perpendicular to a direction in which the waveguide elements 10 are arranged (Y direction) and also perpendicular to a direction in which the optical waveguide layers 20 extend (X direction).

Figure 3B:
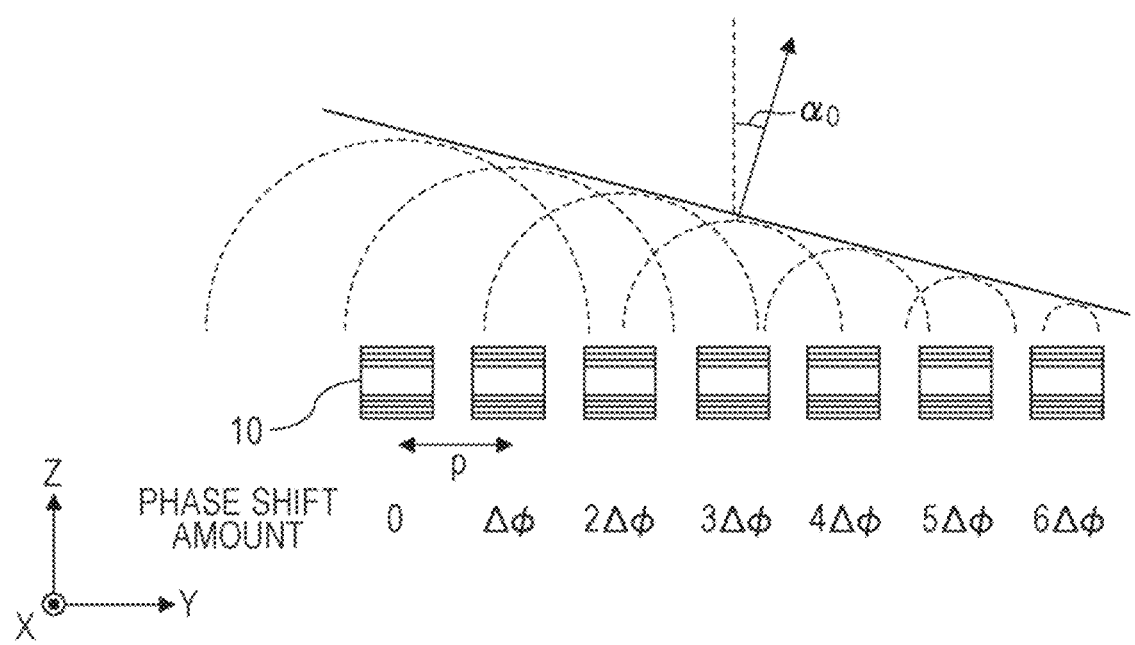
FIG. 3B illustrates the section of the waveguide array from which light is emitted in a different direction from the direction perpendicular to the emission surface of the waveguide array.

FIG. 3B illustrates the section of the waveguide array from which the light is emitted in a different direction from the direction perpendicular to the emission surface of the waveguide array. In the example illustrated in FIG. 3B, the phases of the portions of the light propagating through the respective optical waveguide layers 20 of the plurality of waveguide elements 10 are different from each other by a fixed amount ($\Delta\phi$) in the arrangement direction. In this case, the light is emitted in a different direction from the Z direction. The Y direction component of the wave vector of the light can be changed by changing the $\Delta\phi$. When the center-to-center distance between two adjacent waveguide elements 10 is p, an emission angle $\alpha_0$ of the light can be represented by the following Expression 2.

$$\sin\alpha_0 = \frac{\Delta\phi\lambda}{2\pi p} \quad (2)$$

In the example illustrated in FIG. 2, the light emission direction is parallel to the XZ plane. That is, $\alpha_0=0°$. In the examples illustrated in FIGS. 3A and 3B, the direction of the light emitted from the optical scanning device 100 is parallel to the YZ plane. That is, $\theta=0°$. However, the direction of the light emitted from the optical scanning device 100 is typically parallel to neither the XZ plane nor the YZ plane. That is, $\theta\neq0°$ and $\alpha_0\neq0°$.

Figure 4:
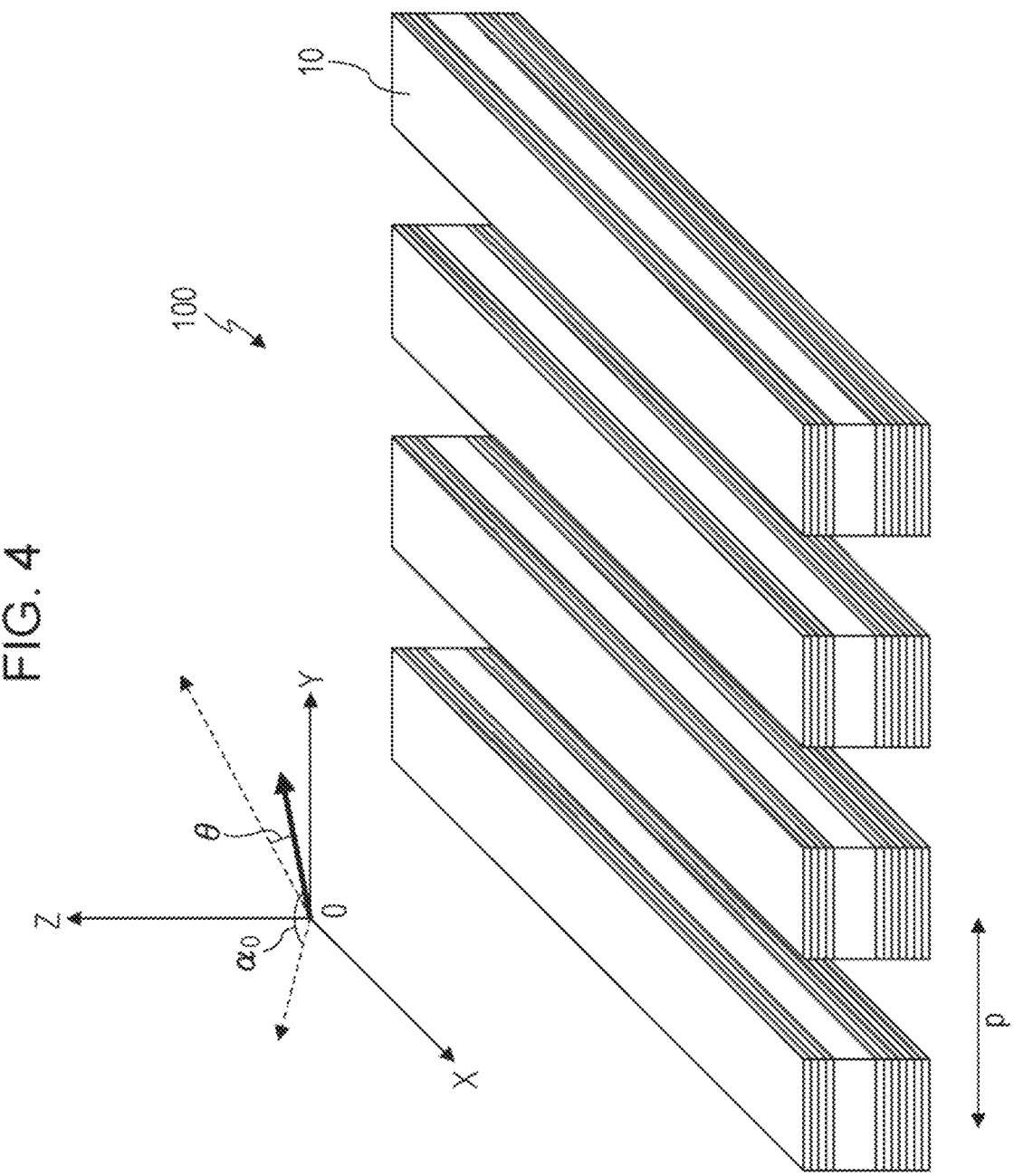
FIG. 4 is a perspective view schematically illustrating the waveguide array in a three-dimensional space.

FIG. 4 is a perspective view schematically illustrating the waveguide array in a three-dimensional space. A bold arrow illustrated in FIG. 4 indicates the direction of the light emitted from the optical scanning device 100. $\theta$ is an angle formed between the light emission direction and the YZ plane. $\theta$ satisfies Expression 1. $\alpha_0$ is an angle formed between the light emission direction and the XZ plane. $\alpha_0$ satisfies Expression 2.

Control of the Phases of Light Guided into the Waveguide Array

For controlling the phase of the light emitted from each of the waveguide elements 10, for example, a phase shifter that changes the phase of the light can be provided at a stage before the light is introduced to the waveguide element 10. The optical scanning device 100 according to the present embodiment includes a plurality of phase shifters connected to the respective waveguide elements 10 and a second adjustment element that adjusts the phases of the light propagating through the phase shifters. The phase shifters each include a waveguide connected to, directly or through another waveguide, a corresponding one of the optical waveguide layers 20 of a corresponding one of the plurality of waveguide elements 10. The second adjustment element changes the phase difference between the portions of the light propagating from the plurality of phase shifters to the plurality of waveguide elements 10, thereby changing the direction of the light emitted from the plurality of waveguide elements 10 (that is, the third direction D3). In the following description, as is the case with the waveguide array, the plurality of arranged phase shifters may be referred to as a "phase shifter array".

Figure 5:
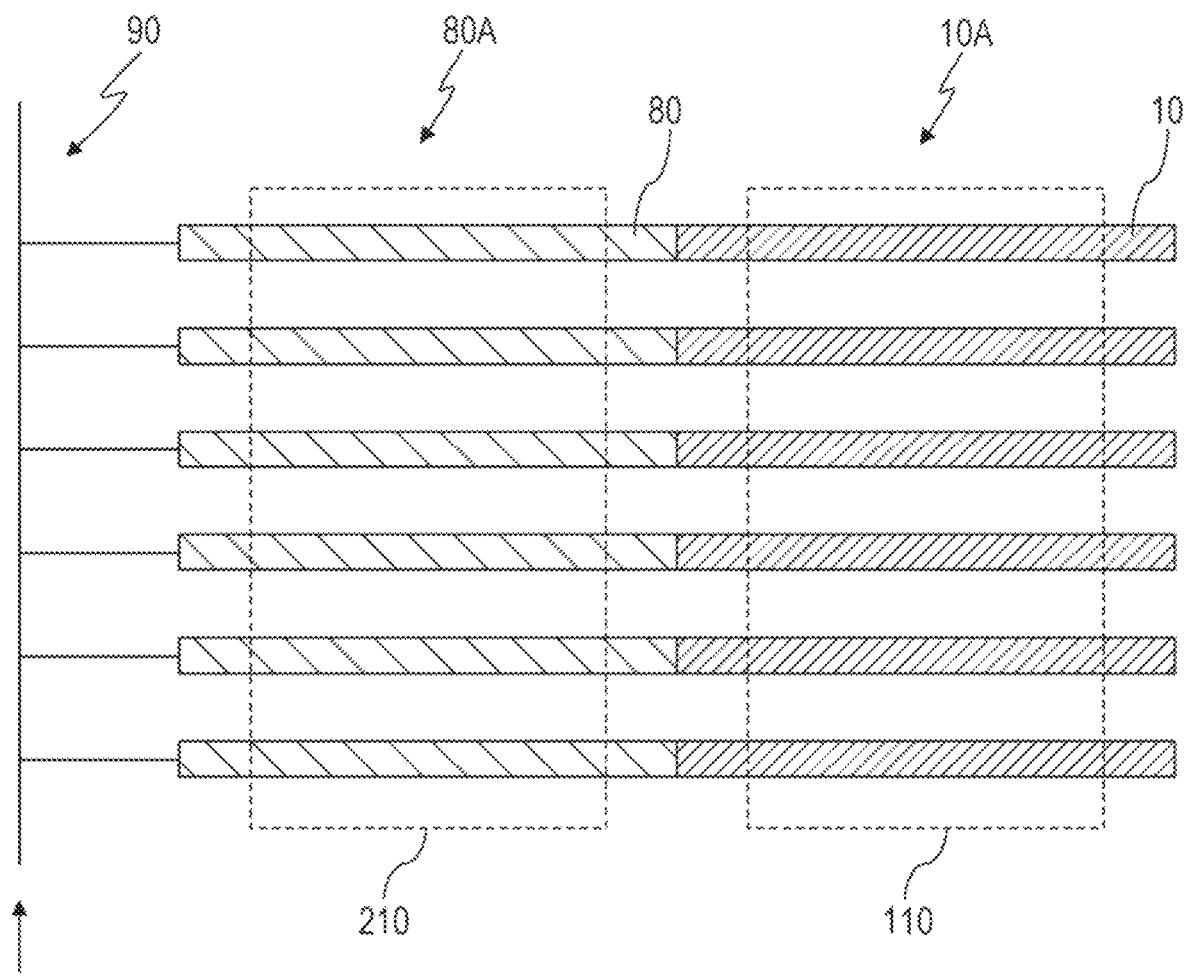
FIG. 5 is a schematic view when a waveguide array and a phase shifter array are seen in the direction (Z direction) normal to a light emission surface.

FIG. 5 is a schematic view when a waveguide array 10A and a phase shifter array 80A are seen in the direction (Z direction) normal to the light emission surface. In an example illustrated in FIG. 5, all phase shifters 80 have the same propagation characteristics and all the waveguide elements 10 have the same propagation characteristics. The phase shifters 80 may be the same or different in length, and the waveguide elements 10 may be the same or different in length. When all the phase shifters 80 have the same length, for example, the phase shift amount can be adjusted with a drive voltage. When the length of the phase shifters 80 is equally stepped up, equally stepped-up phase shift can be applied with the same drive voltage. This optical scanning device 100 further includes an optical branching device 90, a first drive circuit 110, and a second drive circuit 210. The optical branching device 90 branches the light so as to supply the light to a plurality of the phase shifters 80. The first drive circuit 110 drives the waveguide elements 10. The second drive circuit 210 drives the phase shifters 80. A straight-line arrow illustrated in FIG. 5 indicates input of the light. The two-dimensional scanning can be realized by independently controlling the first drive circuit 110 and the second drive circuit 210, which are separately provided. In the present example, the first drive circuit 110 functions as one of parts of the first adjustment element, and the second drive circuit 210 functions as one of parts of the second adjustment element.

The first drive circuit 110 changes at least one of the refractive index and the thickness of the optical waveguide layer 20 in each of the waveguide elements 10, thereby changing the angle of the light emitted from the optical waveguide layer 20. The second drive circuit 210 changes the refractive index of a waveguide 20a in each of the phase shifters 80, thereby changing the phase of the light propagating through the waveguide 20a. The optical branching device 90 may include a waveguide through which the light propagates by total reflection or a reflection waveguide similar to that of the waveguide element 10.

The light may be introduced into the phase shifters 80 after the phases of the light branched by the optical branching device 90 have been controlled. For this phase control, for example, a passive phase control structure with which the length of the waveguides to the phase shifters 80 is adjusted can be used. Alternatively, phase shifters that have the function similar to that of the phase shifters 80 and can be controlled with an electric signal may be used. With any of such methods, for example, the phases may be adjusted before the introduction into the phase shifters 80 so as to supply equiphase portions of the light to all the phase shifters 80. With such adjustment, the control of the phase shifters 80 with the second drive circuit 210 can be simplified.

An optical device having a structure similar to that of the above-described optical scanning device 100 can also be utilized as an optical reception device. Details of, for example, the operating principle and operating method of the optical device are disclosed in U.S. Patent Application Publication No. 2018/0224709, the entire contents of which are incorporated herein by reference.

Fabrication of the Optical Device by Lamination

The optical device 100 according to the present embodiment can be fabricated by, for example, laminating together an upper structure and a lower structure. For example, a sealer such as ultraviolet curable resin or thermosetting resin can be used for the lamination. For optical scanning by voltage application, the optical waveguide layer 20 can include, for example, a liquid crystal material. For infusing the liquid crystal material into the optical device 100, for example, a vacuum seal can be utilized. When the liquid crystal material is infused in a space enclosed by the above-described sealer, vacuum leakage during infusion of the liquid crystal material can be suppressed.

Figure 6:
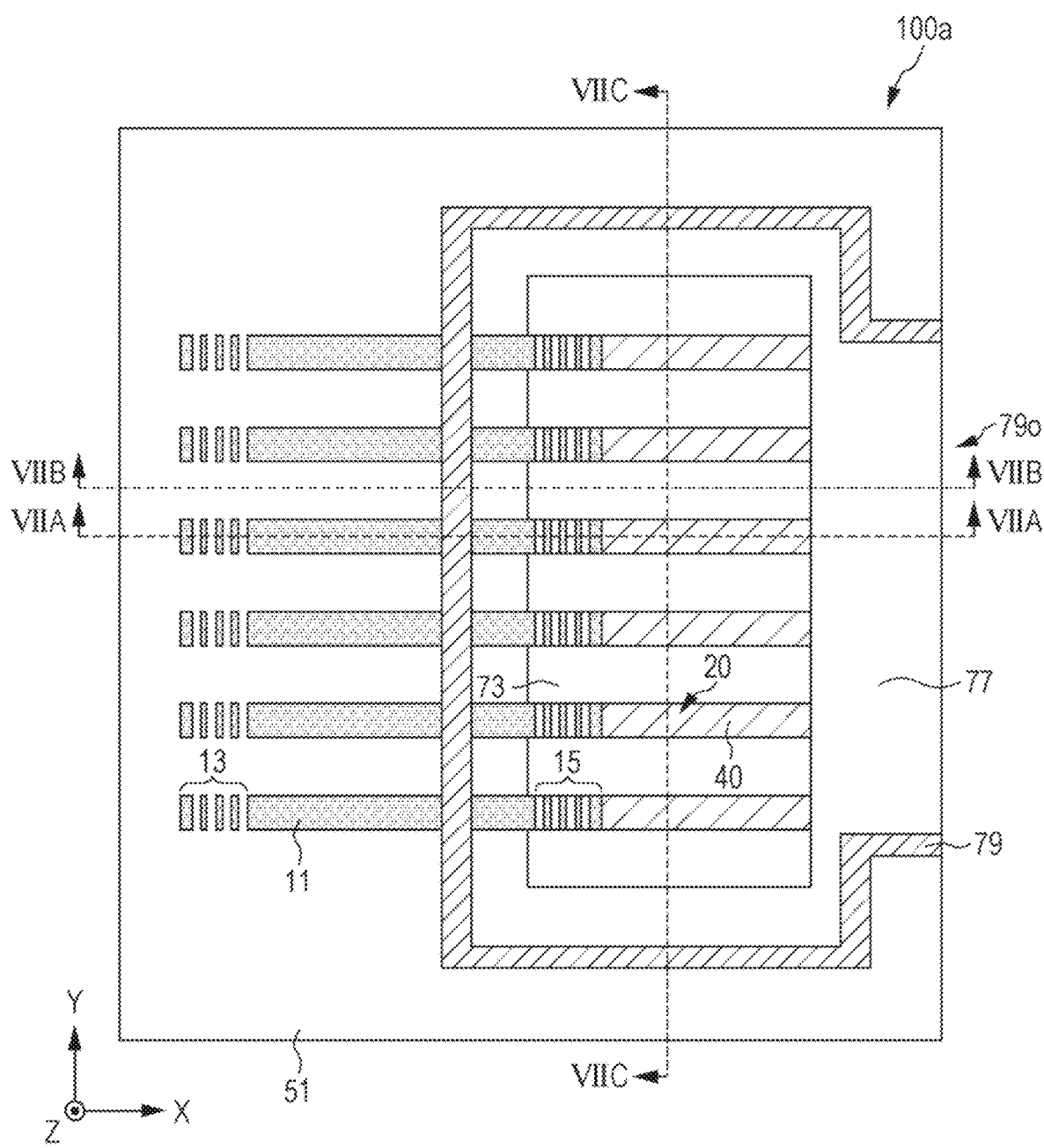
FIG. 6 schematically illustrates an example of a lower structure of an optical device when seen in the Z direction.
Figure 7A:
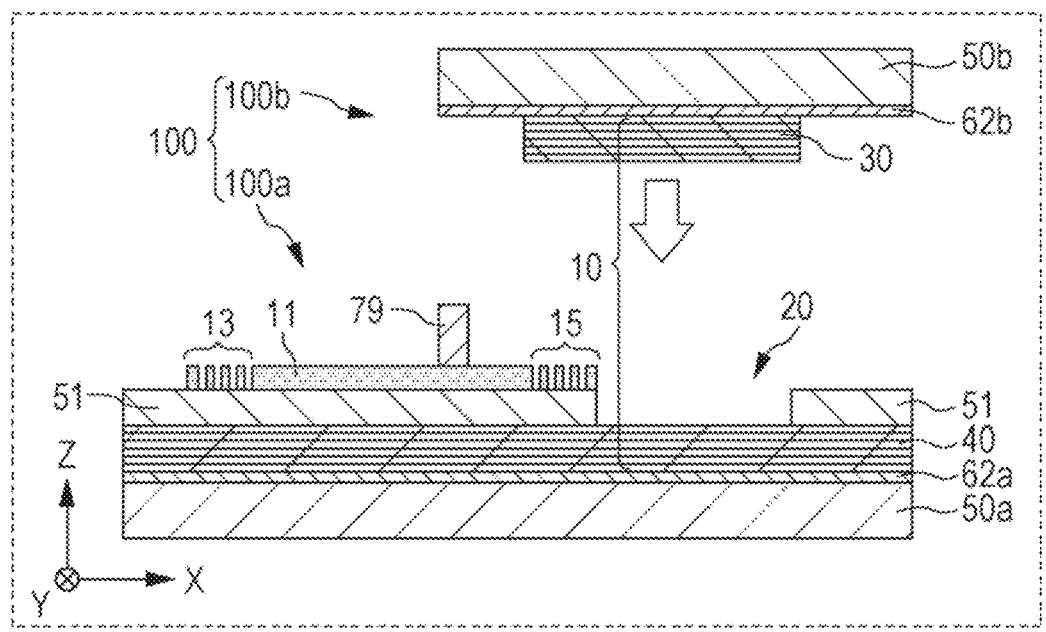
FIG. 7A is a sectional view taken along line VIIA-VIIA illustrated in FIG. 6.
Figure 7B:
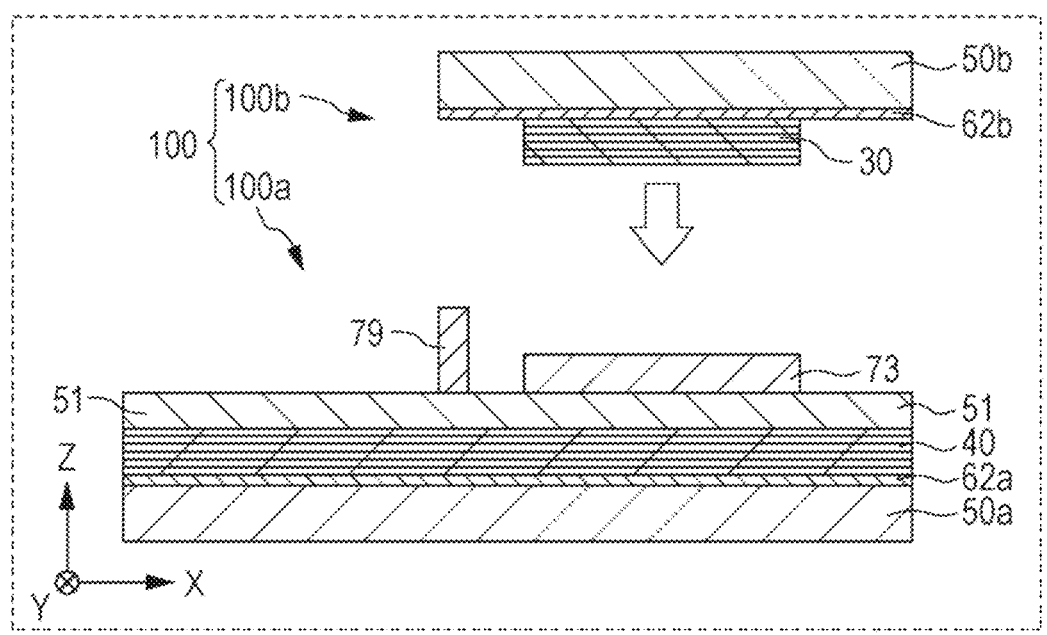
FIG. 7B is a sectional view taken along line VIIB-VIIB illustrated in FIG. 6.
Figure 7C:
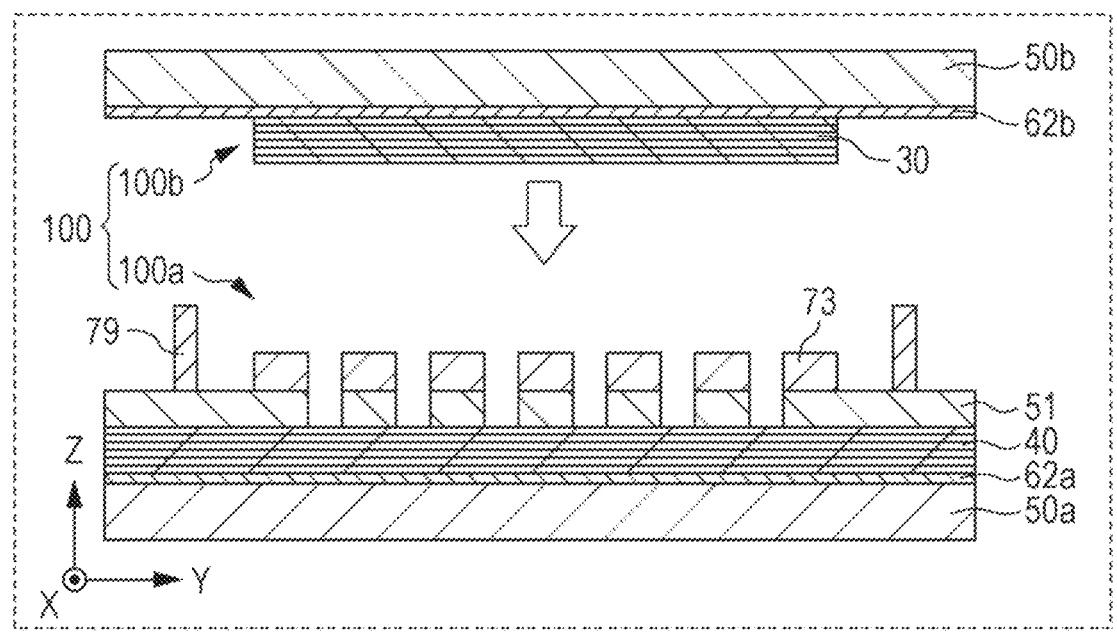
FIG. 7C is a sectional view taken along line VIIC-VIIC illustrated in FIG. 6.

FIG. 6 schematically illustrates an example of a lower structure 100a of the optical device 100 when seen in the Z direction. FIGS. 7A to 7C are sectional views respectively taken along lines VIIA-VIIA, VIIB-VIIB, and VIIC-VIIC illustrated in FIG. 6. FIGS. 7A to 7C schematically illustrate examples of the lower structure 100a and an upper structure 100b of the optical device 100. Down arrows illustrated in FIGS. 7A to 7C indicate a lamination direction.

The lower structure 100a includes a substrate 50a, an electrode 62a, the mirror 40, a dielectric layer 51, one or more optical waveguides 11, a plurality of separation walls 73, and a sealer 79. The upper structure 100b includes a substrate 50b, an electrode 62b, and the mirror 30. After the lower structure 100a and the upper structure 100b have been laminated together, a liquid crystal material is infused through an infusion opening 79o. Then, the infusion opening 79o is closed by the same member as the sealer 79. The details of the elements of the optical device 100 will be described later.

Figure 8A:
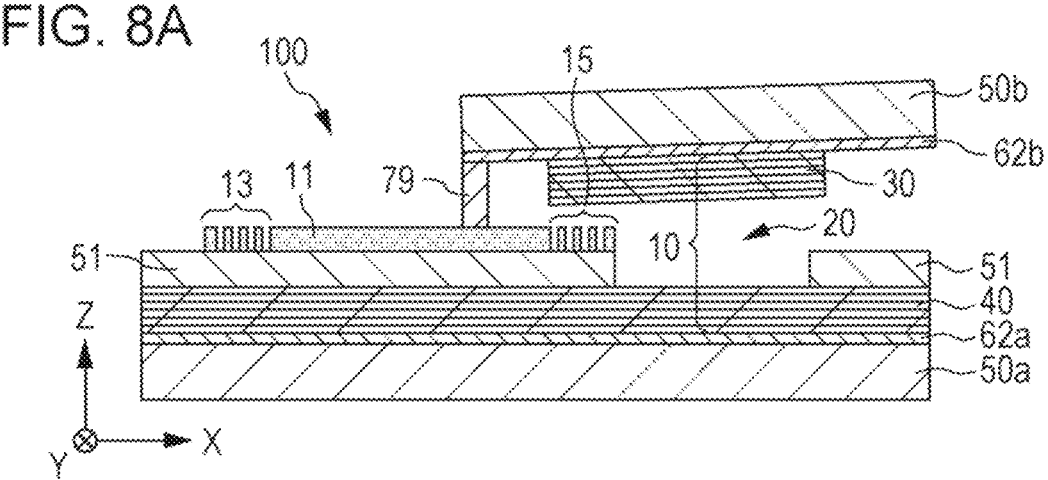
FIG. 8A schematically illustrates an example of the optical device when the lower structure and an upper structure illustrated in FIG. 7A are laminated together.
Figure 8B:
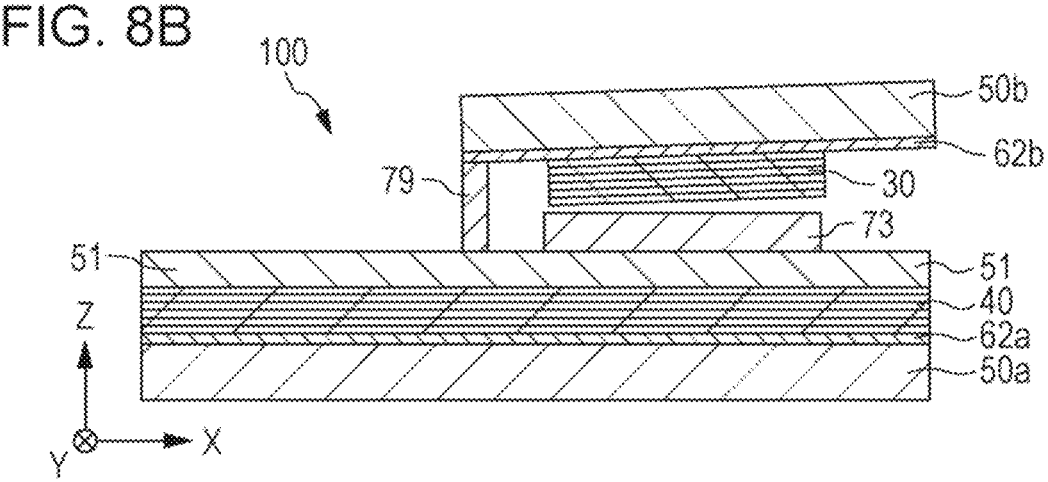
FIG. 8B schematically illustrates the example of the optical device when the lower structure and the upper structure illustrated in FIG. 7B are laminated together.
Figure 8C:
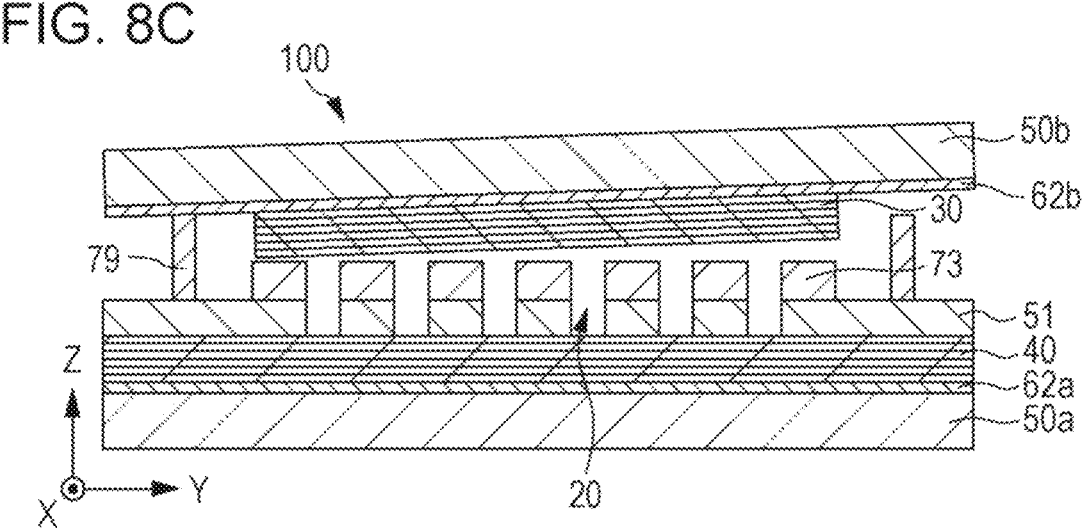
FIG. 8C schematically illustrates the example of the optical device when the lower structure and the upper structure illustrated in FIG. 7C are laminated together.

FIGS. 8A to 8C schematically illustrate an example of the optical device 100 respectively illustrated in FIGS. 7A to 7C when the lower structure 100a and the upper structure 100b are laminated together. As illustrated in FIGS. 8A to 8C, even when it is attempted to laminate together the lower structure 100a and the upper structure 100b such that the lower structure 100a and the upper structure 100b are parallel to each other, actually, the substrate 50a and the substrate 50b are not necessarily disposed parallel to each other. The reason for this is that, when the upper structure 100b and the lower structure 100a are laminated together, a position where the upper structure 100b and the lower structure 100a are first brought into contact with each other serves as a pivot. For example, a position where the sealer 79 and the electrode 62b are brought into contact with each other or a position where one of the plurality of separation walls 73 and the mirror 30 are brought into contact with each other can serve as the pivot. When force applied to the upper structure 100b for lamination is nonuniform, the distance between the substrate 50a and the substrate 50b may differ between a position close to the pivot and a position far from the pivot. For example, the distance between the substrate 50a and the substrate 50b is larger at a position far from the pivot that at a position close to the pivot. Thus, the substrate 50a and substrate 50b are not necessarily parallel to each other. As a result, the intensity and accuracy of the emission angle of the light emitted from the optical device 100 can be reduced.

Based on the above-described study, the inventors have conceived an optical device described in the following aspects.

An optical device according to a first aspect includes a first substrate, a second substrate, a plurality of separation walls, one or more first optical waveguides, and one or more spacers. The first substrate has a surface which extends in a first direction and a second direction intersecting the first direction. The second substrate faces the first substrate. The plurality of separation walls are positioned between the first substrate and the second substrate and extend in the first direction. The one or more first optical waveguides are positioned between the first substrate and the second substrate and include one or more dielectric members which are positioned between the plurality of separation walls and which extend in the first direction. The one or more spacers are directly or indirectly sandwiched between the first substrate and the second substrate and positioned around the one or more first optical waveguides.

In this optical device, the distance between the first substrate and the second substrate can be uniformly set by the one or more spacers positioned around the one or more first optical waveguides. As a result, the intensity and accuracy of an emission angle of emitted light can be significantly improved.

In this optical device, a modulus of elasticity of each of the one or more spacers is smaller than a modulus of elasticity of any one of the plurality of separation walls.

In this optical device, with the spacers that act similarly to springs so as to be compressed, the distance between the first substrate and the second substrate is uniformly set as a whole.

In the optical device according to a second aspect, the plurality of separation walls are directly or indirectly sandwiched between the first substrate and the second substrate in the optical device according to the first aspect. A deformation ratio of each of the one or more spacers in a direction perpendicular to the surface of the first substrate due to being sandwiched between the first substrate and the second substrate is greater than a deformation ratio of any one of the plurality of separation walls In the direction perpendicular to the surface of the first substrate.

In this optical device, due to the deformation ratio of each of the spacers that is greater than the deformation ratio of any one of the plurality of separation walls, the distance between the first substrate and the second substrate is uniformly set as a whole.

In the optical device according to a third aspect, the one or more spacers include a plurality of columnar spacers in the optical device according to the first or second aspect.

With this optical device, the same effect as that obtained with the optical device according to the first and second aspects can be obtained.

The optical device according to a fourth aspect further includes a sealer that fixes a distance between the first substrate and the second substrate in the optical device according to any one of the first to third aspects. The sealer encloses the one or more first optical waveguides and the plurality of separation walls when seen in a direction perpendicular to the surface of the first substrate.

In this optical device, the one or more first optical waveguides and the plurality of separation walls can be hermetically sealed by the first substrate, the second substrate, and the sealer.

In the optical device according to a fifth aspect, a region that is positioned between the first substrate and the second substrate and that is enclosed by the sealer is filled with a member which is identical to the one or more dielectric members in the optical device according to the fourth aspect.

In this optical device, a space hermetically sealed by the first substrate, the second substrate, and the sealer is filled with the member identical to the one or more dielectric members, thereby the one or more first optical waveguides being easily fabricated.

In the optical device according to a sixth aspect, the one or more spacers are positioned inside and/or outside a region enclosed by the sealer in the optical device according to the fourth or fifth aspect.

In this optical device, the one or more spacers are disposed inside and/or outside the region enclosed by the sealer. Thus, the distance between the first substrate and the second substrate is uniformly set as a whole.

The optical device according to a seventh aspect further includes one or more second optical waveguides respectively connected to the one or more first optical waveguides in the optical device according to any one of the first to sixth aspects.

In this optical device, the one or more second optical waveguides are respectively connected to the one or more first optical waveguides. Thus, the light can propagate from the one or more second optical waveguides to the one or more first optical waveguides, respectively.

In the optical device according to an eighth aspect, the one or more first optical waveguides include a plurality of the first optical waveguides and the one or more second optical waveguides include a plurality of the second optical waveguides. In this case, the one or more spacers include at least one spacer provided between two of the plurality of second optical waveguides adjacent to each other in the optical device according to the seventh aspect.

In this optical device, with the at least one spacer provided between two of the plurality of second optical waveguides adjacent to each other, the distance between the first substrate and the second substrate is uniformly set as a whole.

The optical device according to a ninth aspect further includes a dielectric layer positioned between the first substrate and the one or more second optical waveguides in the optical device according to the seventh aspect.

In this optical device, when the height of the dielectric layer disposed between the first substrate and the one or more second optical waveguides is adjusted, light can efficiently propagate from the one or more second optical waveguides to the one or more first optical waveguides, respectively.

In the optical device according to a tenth aspect, each of the one or more second optical waveguides includes a corresponding one of portions positioned between two of the plurality of separation walls adjacent to each other in the optical device according to any one of the seventh to ninth aspects. In this case, the second optical waveguide includes a first grating in the portion positioned between the two of the separation walls adjacent to each other.

In this optical device, with the first grating, a propagation constant of each of the first optical waveguides matches a propagation constant of each of the second optical waveguides. As a result, light can efficiently propagate from the one or more second optical waveguides to the one or more first optical waveguides, respectively.

In the optical device according to an eleventh aspect, each of the one or more second optical waveguides includes a corresponding one of portions that is not superposed, when seen in a direction perpendicular to the surface of the first substrate, on one of the first substrate and the second substrate in the optical device according to any one of the seventh to tenth aspects. In this case, the second optical waveguide includes a second grating in the portion that is not superposed on one of the first substrate and the second substrate.

In this optical device, with the second grating, the light can be efficiently input from outside to each of the second optical waveguides.

The optical device according to a twelfth aspect further includes two mirrors respectively positioned between the first substrate and the one or more dielectric members and between the second substrate and the one or more dielectric members in the optical device according to any one of the first to eleventh aspects.

In this optical device, with the two mirrors, each of the first optical waveguides functions as a reflection waveguide. This allows the light propagating through each of the first optical waveguides to be emitted to the outside.

In the optical device according to a thirteenth aspect, when seen in a direction perpendicular to the surface of the first substrate, at least one of the two mirrors is not formed in a region where the one or more spacers are provided in the optical device according to the twelfth aspect.

In this optical device, the distance in the direction perpendicular to the first substrate can be increased in the region where the one or more spacers are provided. Thus, the distance between the first substrate and the second substrate is uniformly set as a whole even when a large particle enters a gap between the first substrate and the second substrate.

In the optical device according to a fourteenth aspect, the one or more first optical waveguides include a structure that allows adjustment of a refractive index of the one or more dielectric members in the optical device according to any one of the first to thirteenth aspects. When the refractive index of the one or more dielectric members is adjusted, a direction of light emitted from the one or more first optical waveguides through the first substrate or the second substrate or an incident direction of light input to the one or more first optical waveguides through the first substrate or the second substrate is changed.

This optical device can realize an optical scanning device that can change a light emission direction or an optical reception device that can change a light receiving direction.

The optical device according to a fifteenth aspect further includes a pair of electrodes between which the one or more dielectric members are sandwiched in the optical device according to the fourteenth aspect. In this case, the one or more dielectric members include a liquid crystal material or an electrooptic material. In this case, when a voltage is applied to the pair of electrodes, the refractive index of the one or more dielectric members is adjusted.

In this optical device, the optical device according to the fourteenth aspect can be realized by applying the voltage.

The optical device according to a sixteenth aspect further includes one or more phase shifters respectively connected to the one or more optical waveguides directly or through one or more of other optical waveguides in the optical device according to the fifteenth aspect. In this case, when a phase difference between portions of light respectively passing through the one or more phase shifters is changed, the direction of the light emitted from the one or more first optical waveguides through the first substrate or the second substrate or the incident direction of the light input to the one or more first optical waveguides through the first substrate or the second substrate is changed.

This optical device, with the one or more phase shifters, can realize the optical scanning device that can independently change the light emission direction in two directions or the optical reception device that can independently change the reception direction of the light in two directions.

An optical detection system according to a seventeenth aspect includes the optical device according to any one of the first to sixteenth aspects, an optical detector, and a signal processor. The optical detector detects light emitted from the optical device and reflected by an object. The signal processor generates distance distribution data based on output of the optical detector.

With this optical detection system, when the time taken for the light reflected by the object to return is measured, the distance distribution data of the object can be obtained.

Embodiment

Figure 9:
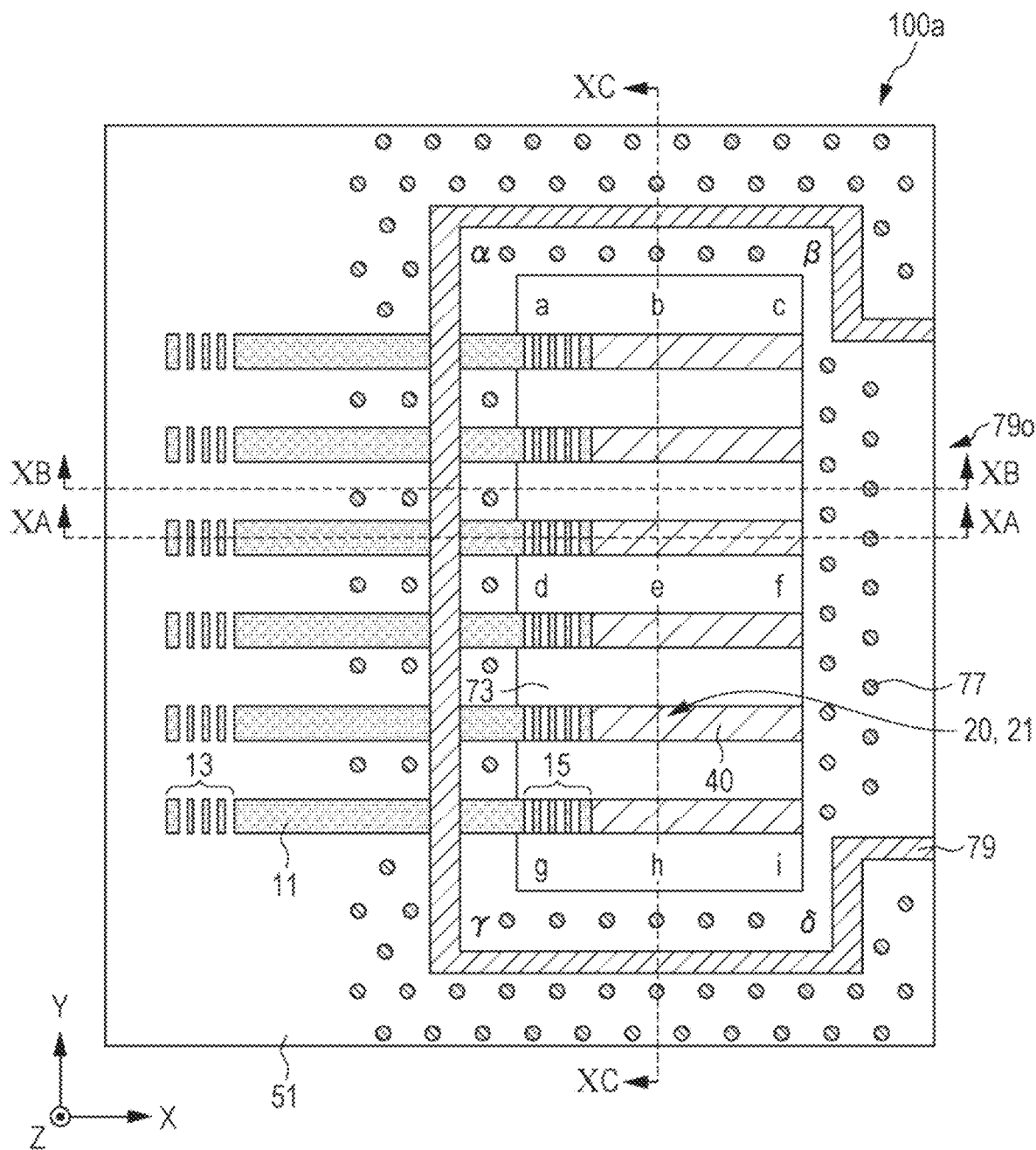
FIG. 9 schematically illustrates an example of the lower structure of the optical device when seen in the Z direction.
Figure 10A:
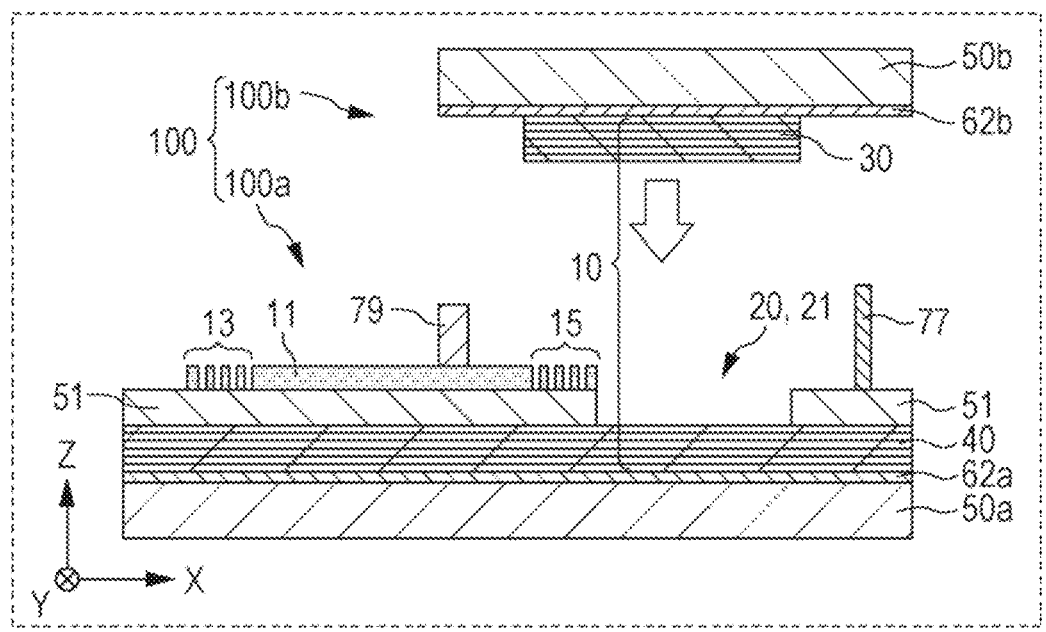
FIG. 10A is a sectional view taken along line XA-XA illustrated in FIG. 9.
Figure 10B:
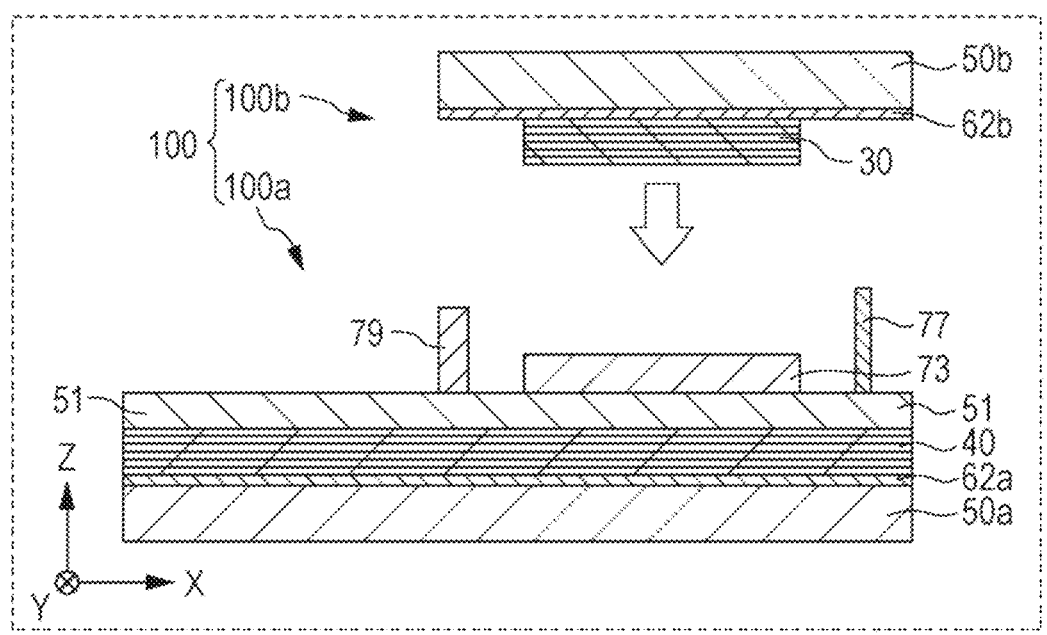
FIG. 10B is a sectional view taken along line XB-XB illustrated in FIG. 9.
Figure 10C:
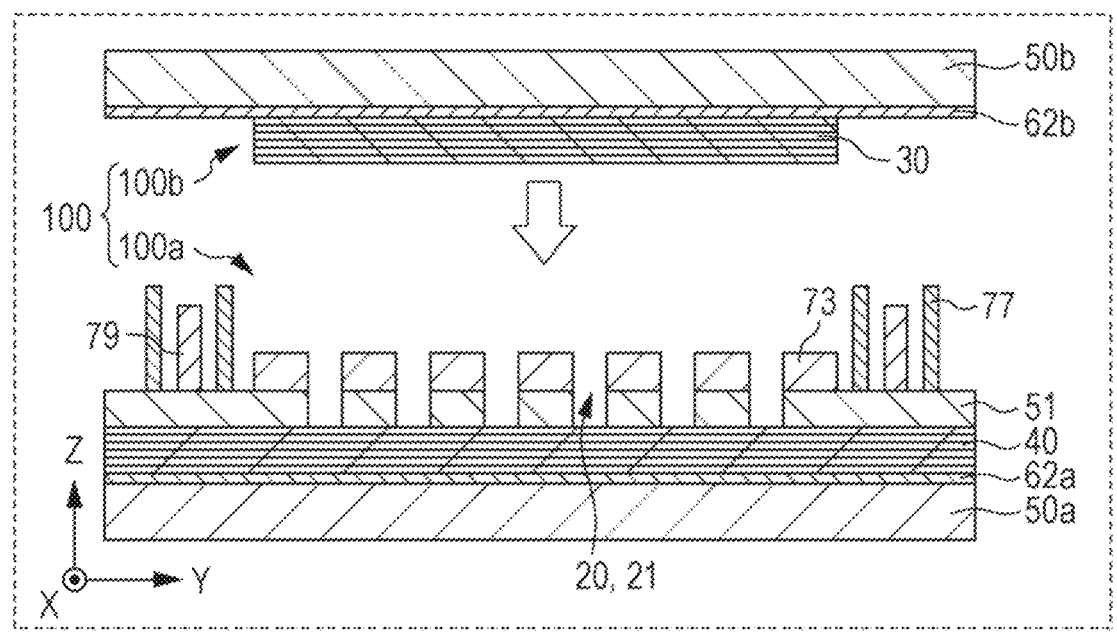
FIG. 10C is a sectional view taken along line XC-XC illustrated in FIG. 9.

FIG. 9 schematically illustrates an example of the lower structure 100*a* of the optical device 100 when seen in the Z direction. FIGS. 10A to 10C are sectional views respectively taken along lines XA-XA, XB-XB, and XC-XC illustrated in FIG. 9. FIGS. 10A to 10C schematically illustrate examples of the lower structure 100*a* and the upper structure 100*b* of the optical device 100. Hereafter, with reference to the examples illustrated in FIGS. 9 and 10A to 10C, the examples of the optical device 100 according to the present embodiment are described.

The optical device 100 according to the present embodiment includes the first substrate 50*a*, the second substrate 50*b*, the plurality of separation walls 73, the one or more first optical waveguides 10, the one or more spacers 77, the sealer 79, and the one or more second optical waveguides 11. In the following description, the "first substrate 50*a*" and the "second substrate 50*b*" are respectively referred to as the "substrate 50*a*" and the "substrate 50*b*", and the "first optical waveguides 10" and the "second optical waveguides 11" are respectively referred to as the "optical waveguide 10" and the "optical waveguide 11".

The optical device 100 according to the present embodiment can be separated into the lower structure 100*a* and the upper structure 100*b*.

The lower structure 100*a* includes the substrate 50*a*, the electrode 62*a*, the mirror 40, the dielectric layer 51, the plurality of separation walls 73, the one or more spacers 77, the sealer 79, and the one or more optical waveguides 11. The substrate 50*a* has a surface extending in the X direction and the Y direction. The electrode 62*a* is provided on the substrate 50*a*. The mirror 40 is provided on the electrode 62*a*. The dielectric layer 51 is provided on the mirror 40. The plurality of separation walls 73, the one or more spacers 77, the sealer 79, and the one or more optical waveguides 11 are provided on the dielectric layer 51.

The upper structure 100*b* includes the substrate 50*b*, the electrode 62*b*, and the mirror 30. The substrate 50*b* faces the substrate 50*a*. The electrode 62*b* is provided on the substrate 50*b*. The mirror 30 is provided on the electrode 62*b*.

A substrate out of the substrate 50*a* and the substrate 50*b* through which light is emitted has light transparency. Both the substrate 50*a* and the substrate 50*b* may have the light transparency. Likewise, an electrode out of the electrode 62*a* and the electrode 62*b* through which the light is emitted has light transparency. Both the electrode 62*a* and the electrode 62*b* may have the light transparency. In the example illustrated in FIGS. 9 and 10A to 10C, the light is emitted from the one or more optical waveguides 10 through the electrode 62*b* and the substrate 50*b* of the upper structure 100*b*.

The plurality of separation walls 73 are positioned between the substrate 50*a* and the substrate 50*b* and arranged in the Y direction. Each of the separation walls 73 extends in the X direction.

The one or more optical waveguides 10 are positioned between the substrate 50*a* and the substrate 50*b*. The one or more optical waveguides 10 are positioned between the plurality of separation walls 73. The one or more optical waveguides 10 are slow-light waveguides that include the mirror 30, the mirror 40, and one or more dielectric members 21 that extend in the X direction. The one or more dielectric members 21 include, for example, a liquid crystal material or an electrooptic material. The one or more dielectric members 21 are positioned between the mirror 30 and the mirror 40. It can be said that the mirror 40 is positioned between the substrate 50*a* and the one or more dielectric members 21 and the mirror 30 is positioned between the substrate 50*b* and the one or more dielectric members 21. The dielectric members 21 correspond to the respective optical waveguide layers 20 illustrated in FIG. 2. In the example illustrated in FIGS. 9 and 10A to 10C, part of the dielectric layer 51 in the optical waveguide layers 20 is removed and part of the mirror 40 is exposed. As a result, the optical waveguide layers 20 are sandwiched between the mirror 30 and the mirror 40. The mirror 30 of the one or more optical waveguides 10 is integrally formed in the XY plane. The mirror 40 of the one or more optical waveguides 10 is integrally formed in the XY plane.

The refractive index of the one or more dielectric members 21 is greater than the refractive index of the plurality of separation walls 73 and the dielectric layer 51. Thus, the light propagating through the optical waveguide layers 20 does not leak to the separation walls 73 and the dielectric layer 51 disposed immediately below the separation walls 73. The light propagating through the optical waveguide layers 20 undergoes total reflection at interfaces between the optical waveguide layers 20 and the separation walls 73 and interfaces between the optical waveguide layers 20 and the dielectric layer 51.

The one or more dielectric members 21 are directly or indirectly sandwiched between the pair of the electrode 62*a* and the electrode 62*b*. When a voltage is applied to the pair of the electrode 62*a* and the electrode 62*b*, the refractive index of the one or more dielectric members 21 is adjusted. This changes the emission angle of the light emitted from the one or more optical waveguides 10 to the outside.

The one or more optical waveguides 10 are not necessarily slow-light waveguides. The one or more optical waveguides 10 may be, for example, waveguides through which the light propagates by total reflection. In these waveguides, the light is emitted to the outside not through the substrate 50*a* or the substrate 50*b* but through end portions of the optical waveguides 10.

The one or more spacers 77 are positioned around the one or more optical waveguides 10. In the example illustrated in FIG. 9, a plurality of the columnar spacers 77 are arranged in a two-dimensional manner. The plurality of columnar spacers 77 may be regularly or irregularly arranged. The diameter of the spacers 77 in the XY plane is 10 to 100 μm. In the example illustrated in FIG. 9, the one or more spacers 77 are positioned inside and outside the region enclosed by the sealer 79. The one or more spacers 77 are positioned inside and/or outside the region. In the example illustrated in FIG. 9, in the optical device 100 that includes a plurality of the optical waveguides 10 and a plurality of the optical waveguides 11, the one or more spacers 77 include at least one spacer 77 provided between two of the plurality of optical waveguides 11 adjacent to each other. The one or more spacers 77 may be provided in the optical waveguide layers 20. In this case, the density of the light propagating through the optical waveguide layers 20 is reduced by the amount corresponding to the spacers 77. The one or more spacers 77 may have a single connected linear shape inside and outside the region enclosed by the sealer 79. Examples of the linear shape include, for example, a straight line shape, curved shape, wavy line shape, and zig-zag shape.

Before the lower structure 100*a* and the upper structure 100*b* are laminated together, the dimension of the spacers 77 in the Z direction is greater than the total of the dimension of the separation walls 73 and the dimension of the mirror 30 in the Z direction. Furthermore, the dimension of the spacers 77 in the Z direction is greater than the dimension of the sealer 79 in the Z direction. Thus, during laminating together the lower structure 100*a* and the upper structure 100*b*, the electrode 62*b* of the upper structure 100*b* is brought into contact with the one or more spacers 77 of the lower structure 100*a* first. Accordingly, neither a position where the sealer 79 and the electrode 62*b* are brought into contact with each other nor a position where one of the plurality of separation walls 73 and the mirror 30 are brought into contact with each other serves as the pivot.

Elastic deformation occurs in each of the spacers 77. When distortion is generated by applying force to an elastic body, the modulus of elasticity is defined by dividing the applied force by the generated distortion. The modulus of elasticity of each of the spacers 77 is smaller than the modulus of elasticity of each of the separation walls 73 and the modulus of elasticity of the mirror 30. That is, the spacers 77 are more likely to deform than the separation walls 73 and the mirror 30. When the lower structure 100*a* and the upper structure 100*b* are laminated together, the spacers 77 act similarly to springs so as to be compressed. This allows uniform contact between upper surfaces of the plurality of separation walls 73 and the reflection surface of the mirror 30, thereby the distance between the substrate 50*a* and the substrate 50*b* being uniformly set as a whole. As a result, the substrate 50*a* and the substrate 50*b* are set to be parallel to each other. At this time, the deformation ratio of the spacers 77 is greater than the deformation ratio of the separation walls 73 in the Z direction. The deformation ratio of the separation walls 73 may be zero.

The sealer 79 fixes the distance between the substrate 50*a* and the substrate 50*b*. As illustrated in FIG. 9, when seen in the Z direction, the sealer 79 encloses the one or more optical waveguides 10 and the plurality of separation walls 73. In the Y direction, the sealer 79 is provided so as to cross the one or more optical waveguides 11. An upper surface of the sealer 79 is parallel to the XY plane. The dimension of the sealer 79 in the Z direction on the dielectric layer 51 is greater than or equal to the total of the dimension of the separation walls 73 and the dimension of the mirror 30 in the Z direction. The sealer is, for example, ultraviolet curable resin or thermosetting resin. The sealer 79 is not necessarily ultraviolet curable resin or thermosetting resin as long as the sealer 79 can maintain the distance between the substrate 50*a* and the substrate 50*b* over a long period of time.

The one or more optical waveguides 11 are respectively connected to the one or more optical waveguides 10. The light is supplied from the one or more optical waveguides 11 to the respective one or more optical waveguides 10. In the example illustrated in FIGS. 9 and 10A to 10C, the one or more optical waveguides 11 are positioned on the dielectric layer 51. In other words, the dielectric layer 51 is positioned between the substrate 50*a* and the one or more optical waveguides 11. When the dimension of the dielectric layer 51 in the Z direction is adjusted, the light propagating through each of the optical waveguides 11 is highly efficiently coupled to a corresponding one of the optical waveguides 10. For example, the dimension of the dielectric layer 51 in the Z direction can be adjusted such that each of the optical waveguides 11 are positioned near the center of a corresponding one of the optical waveguide layers 20 in the Z direction. Each of the optical waveguides 11 is a waveguide through which the light propagates by total reflection. Accordingly, the refractive index of the optical waveguides 11 is higher than the refractive index of the dielectric layer 51. Each of the optical waveguides 11 may be a slow-light waveguide.

Each of the optical waveguides 11 includes a portion positioned between two of the plurality of separation walls 73 adjacent to each other. The optical waveguide 11 may include a grating 15 at this portion. The propagation constant of each of the optical waveguides 11 is different from the propagation constant of each of the optical waveguides 10. Because of the grating 15, the propagation constant of the optical waveguide 11 is reduced by an amount corresponding to the reciprocal lattice. When the propagation constant of the optical waveguide 11 shifted by the amount corresponding to the reciprocal lattice is coincident with the propagation constant of the optical waveguide 10, the light propagating through the optical waveguide 11 is highly efficiently coupled to the optical waveguide 10.

When seen in the Z direction, each of the optical waveguides 11 includes a portion that is not superposed on one of the substrate 50*a* and the substrate 50*b*. The optical waveguide 11 may include a grating 13 at this non-superposed position. In the example illustrated in FIGS. 9 and 10A to 10C, the optical waveguide 11 includes the portion not superposed on the substrate 50*b*. For the reason similar to the above description, because of the grating 13, the light input from the outside is highly efficiently coupled to the optical waveguide 11.

Figure 11A:
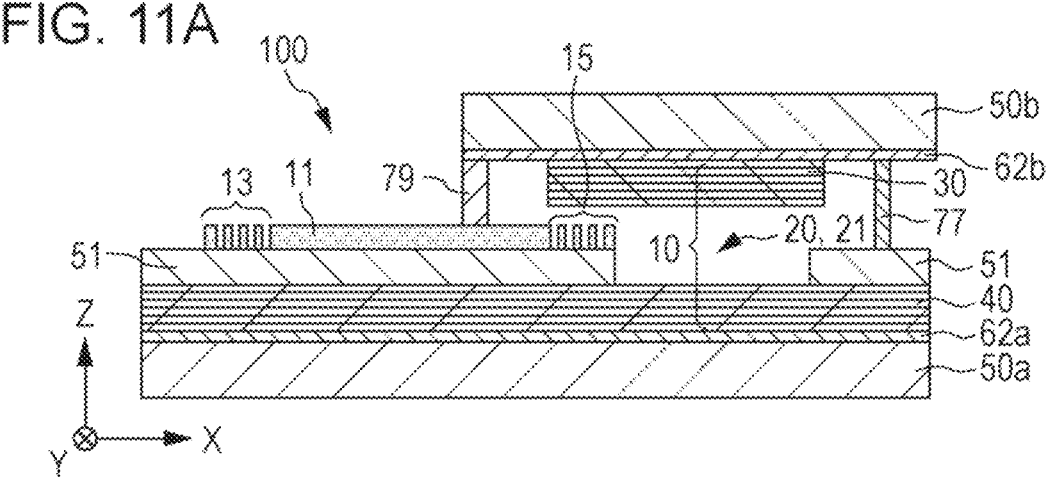
FIG. 11A schematically illustrates an example of the optical device when the lower structure and an upper structure illustrated in FIG. 10A are laminated together.
Figure 11B:
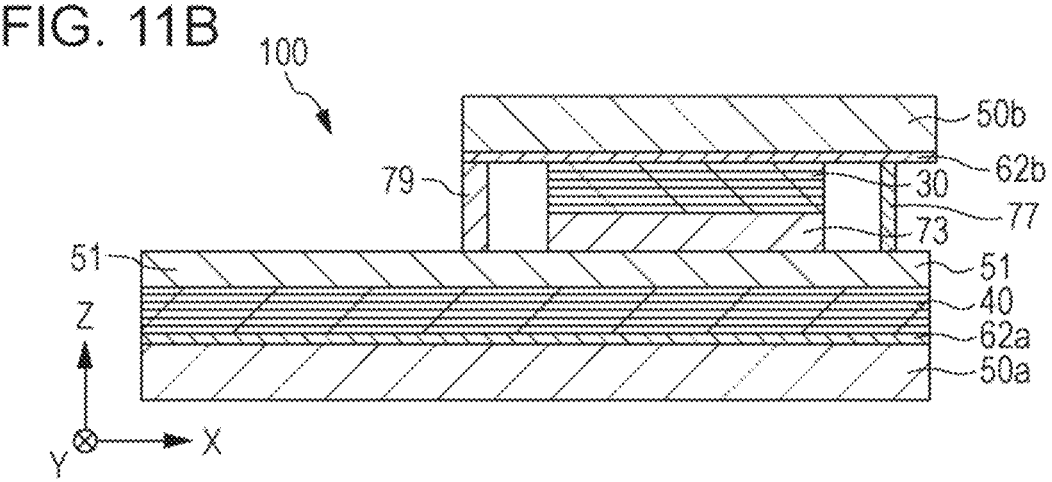
FIG. 11B schematically illustrates the example of the optical device when the lower structure and the upper structure illustrated in FIG. 10B are laminated together.
Figure 11C:
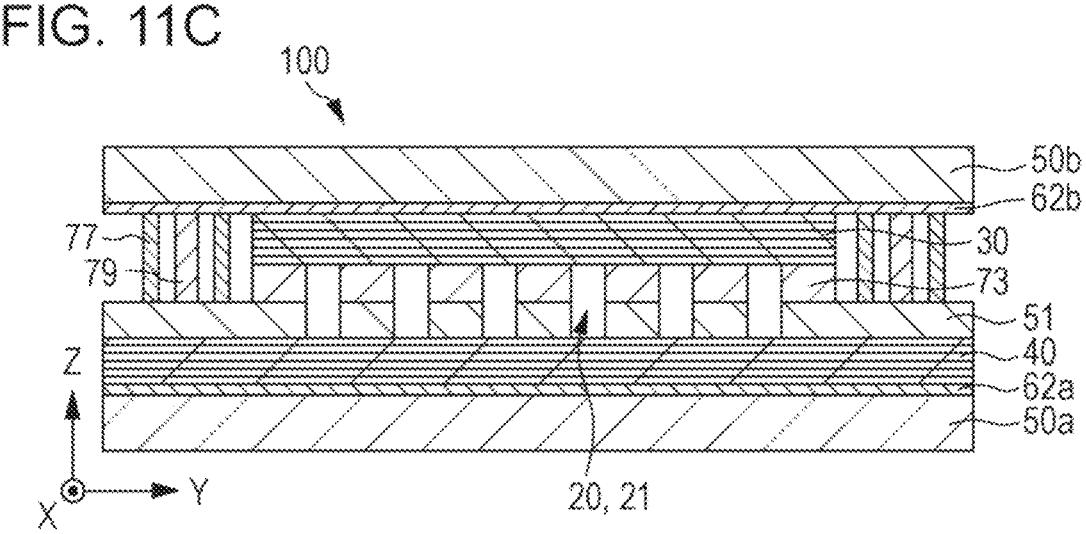
FIG. 11C schematically illustrates the example of the optical device when the lower structure and the upper structure illustrated in FIG. 10C are laminated together.

FIGS. 11A to 11C schematically illustrate an example of the optical device 100 respectively illustrated in FIGS. 10A to 10C when the lower structure 100*a* and the upper structure 100*b* are laminated together. As illustrated in FIGS. 11A to 11C, the substrate 50a and the substrate 50b are disposed parallel to each other by the one or more spacers 77. The one or more spacers 77 are directly or indirectly sandwiched between the substrate 50a and the substrate 50b. In the example illustrated in FIGS. 11A to 11C, the one or more spacers 77 are directly sandwiched between the dielectric layer 51 of the lower structure 100a and the electrode 62b of the upper structure 100b. The dimension of each of the spacers 77 in the Z direction is greater than the dimension of the separation walls 73 in the Z direction. The airtightness of a region enclosed by the lower structure 100a, the upper structure 100b, and the sealer 79 is increased by the spacers 77. After the lower structure 100a and the upper structure 100b have been laminated together, the liquid crystal material is infused through the infusion opening 79o. Then, the infusion opening 79o is closed by the same member as the sealer 79. The region hermetically sealed as described above is filled with the liquid crystal material as a whole. This region can also be referred to as a region that is positioned between the substrate 50a and the substrate 50b and enclosed by the sealer 79. It can also be said that this region is filled with the same member as the one or more dielectric members 21.

The details of the materials and dimensions of the elements used to fabricate the optical device 100 according to the present embodiment are described below. Hereafter, a dimension in the Z direction may be referred to as a "thickness".

First, the details of the materials and the dimensions of the elements of the lower structure 100a are described.

The substrate 50a is formed of an SiO$_2$ layer. The dimensions of the substrate 50a in both the X direction and the Y direction are 15 mm, and the thickness of the substrate 50a is 0.7 mm.

The electrode 62a is formed of an indium tin oxide (ITO) sputtered layer. The thickness of the electrode 62a is 50 nm.

The mirror 40 is a multilayer reflection film. The multilayer reflection film is formed by evaporatively depositing and stacking an Nb$_2$O$_5$ layer and an SiO$_2$ layer alternately. The Nb$_2$O$_5$ layer has a refractive index n of 2.282 and a thickness of 100 nm. The SiO$_2$ layer has a refractive index n of 1.468 and a thickness of 200 nm. The mirror 40 includes a total 61 layers including 31 Nb$_2$O$_5$ layers and 30 SiO$_2$ layers. The thickness of the mirror 40 is 9.1 µm.

The dielectric layer 51 is formed of an SiO$_2$ deposited layer.
The SiO$_2$ deposited layer has a refractive index n of 1.468 and the thickness of 1.0 µm.

Each of the optical waveguides 11 are formed of an Nb$_2$O$_5$ deposited layer. The Nb$_2$O$_5$ deposited layer has a refractive index n of 2.282 and a thickness of 300 nm. The grating 15 and the grating 13 are formed in each of the optical waveguides 11. The duty ratio and the pitch of the grating 15 are 1:1 and 640 nm, respectively. The duty ratio and the pitch of the grating 13 are 1:1 and 680 nm, respectively. The grating 15 and the grating 13 are formed by photolithographic patterning. The dimension of the optical waveguide 11 in the Y direction is 10 µm.

The plurality of separation walls 73 are formed of an SiO$_2$ deposited layer. The SiO$_2$ deposited layer has a refractive index n of 1.468 and the thickness of 1.0 µm. The dimension of each of the separation walls 73 in the Y direction is 50 µm.

In the optical waveguide layers 20, part of the dielectric layer 51 is removed by photolithographic patterning. The thickness of the optical waveguide layers 20 is 2.0 µm. The dimension of the optical waveguide layers 20 in the Y direction is 10 µm.

Next, the details of the materials and the dimensions of the elements of the upper structure 100b are described.

The substrate 50b is formed of an SiO$_2$ layer. The dimensions of the substrate 50b in the X direction and the Y direction are 8 mm and 20 mm, respectively, and the thickness of the substrate 50b is 0.7 mm.

The electrode 62b is formed of an ITO sputtered layer. The thickness of the electrode 62b is 50 nm.

The mirror 30 is a multilayer reflection film. The multilayer reflection film is formed by evaporatively depositing and stacking an Nb$_2$O$_5$ layer and an SiO$_2$ layer alternately. The Nb$_2$O$_5$ layer has a refractive index n of 2.282 and a thickness of 100 nm. The SiO$_2$ layer has a refractive index n of 1.468 and a thickness of 200 nm. The mirror 30 includes a total thirteen layers including seven Nb$_2$O$_5$ layers and six SiO$_2$ layers. The thickness of the mirror 30 is 1.9 µm.

Next, the details of the materials and the dimensions of the spacers 77 and the sealer 79 are described.

Micropearl EX-003 made by Sekisui Chemical CO., LTD. is used for the spacers 77. Before the lower structure 100a and the upper structure 100b are laminated together, the dimension of each of the spacers 77 in the Z direction is 3.0 µm. The dimension of the spacers 77 is greater than 2.9 µm that is the total of 1 µm, the thickness of the separation walls 73, and 1.9 µm, the thickness of the mirror 30.

A 5CB liquid crystal is used for the one or more dielectric members 21.

An ultraviolet curable adhesive 3026E made by Three Bond is used for the sealer 79. The sealer 79 is cured by being irradiated with ultraviolet radiation at a wavelength of 365 nm and energy density of 100 mJ/cm$^2$ so as to laminate together the lower structure 100a and the upper structure 100b. Thus, the optical device 100 according to the present embodiment is obtained.

The substrate 50a or the substrate 50b is not necessarily formed of SiO$_2$. The substrate 50a and the substrate 50b may be, for example, inorganic substrates formed of glass, sapphire, or the like, or resin substrates formed of acrylic, polycarbonate, or the like. These inorganic substrates and the resin substrates have light transparency.

The light transmittance of the mirror 30 through which the light emitted is, for example, 99.9%. The light transmittance of the mirror 40 through which the light is not emitted is, for example, 99.99%. These conditions can be realized by adjusting the number of layers of each of the multilayer reflection films. For example, a combination of two layers in the multilayer reflection film is such that the refractive index of one of the layers is greater than or equal to 2 and the refractive index of the other layer is less than 2. A high reflection coefficient can be obtained when the difference between two refractive indices is great. A layer having a refractive index of greater than or equal to 2 is formed of, for example, SiN$_x$, AlN$_x$, TiO$_x$, ZrO$_x$, NbO$_x$, or TaO$_x$. A layer having a refractive index of less than 2 is formed of, for example, SiO$_x$ or AlO$_x$.

The refractive index of the dielectric layer 51 is, for example, less than 2. The refractive index of each of the optical waveguides 11 is, for example, greater than or equal to 2. Evanescent light that seeps from the optical waveguides 11 to the dielectric layer 51 can be reduced when the difference between two refractive indices is great.

Next, results of measurement of the distance at positions a to i and positions α to δ illustrated in FIG. 9 are described. The distance was investigated by retardation measurement. In the measurement, 75 optical waveguides 10 were used. The positions a, b, c or the positions g, h, i are three positions in separation walls disposed at the ends out of the plurality of separation walls 73. The positions d, e, f are three positions in a separation wall disposed at the center out of the plurality of separation walls 73. The positions α to δ are at four corners of the region surrounded by the sealer 79.

The distance at the positions a to i is the distance between the corresponding separation walls 73 and the mirror 30 in the Z direction. The theoretical value of this distance is 0 nm. The distance at the positions α to δ is the distance between the dielectric layer 51 and the electrode 62b in the Z direction. The theoretical value of this distance is 2.9 μm.

Table 1 lists the distance at the positions a to i and α to δ when none of the one or more spacers 77 are provided.

TABLE 1

| Position | Distance (μm) | Position | Distance (μm) |
|---|---|---|---|
| a | 0.082 | α | 2.95 |
| b | 0.161 | β | 3.31 |
| c | 0.424 | χ | 2.96 |
| d | 0.004 | δ | 3.19 |
| e | 0.081 | Average | 3.10 |
| f | 0.221 | Standard deviation | 0.154 |
| g | 0.006 | | |
| h | 0.081 | | |
| i | 0.251 | | |
| Average | 0.146 | | |
| Standard deviation | 0.128 | | |

When none of the one or more spacers 77 are provided, the average of values of the distance at the positions a to i is 0.146 μm. The standard deviation in this case is 0.128 μm. The average of values of the distance at the positions α to δ is 3.10 μm. The standard deviation in this case is 0.154 μm. Thus, the average distance is comparatively greatly different from the above-described theoretical value, variation of the distance is great, and the distance is not uniform.

Table 2 lists the distance at the positions a to i and α to δ when the one or more spacers 77 are provided.

TABLE 2

| Position | Distance (μm) | Position | Distance (μm) |
|---|---|---|---|
| a | 0.004 | α | 2.94 |
| b | 0.011 | β | 2.93 |
| c | 0.009 | χ | 2.94 |
| d | 0.007 | δ | 2.95 |
| e | 0.015 | Average | 2.94 |
| f | 0.007 | Standard deviation | 0.007 |
| g | 0.009 | | |
| h | 0.017 | | |
| i | 0.015 | | |
| Average | 0.010 | | |
| Standard deviation | 0.004 | | |

When the one or more spacers 77 are provided, the average of values of the distance at the positions a to i is 0.01 μm. The standard deviation in this case is 0.004 μm. The average of values of the distance at the positions α to δ is 2.94 μm. The standard deviation in this case is 0.007 μm. Thus, it can be said that the average distance is close to the above-described theoretical value, variation of the distance is sufficiently small, and the distance is uniform. That is, with the optical device 100 according to the present embodiment, the uniformity of the distance between the substrate 50a and the substrate 50b can be significantly improved by the one or more spacers 77.

Furthermore, in the optical device 100 according to the present embodiment, the first mirror 30 is not formed at a region of the upper structure 100b where the spacers 77 are formed. With such a configuration, a large distance in the Z direction can be provided in a region where the spacers 77 and the sealer 79 are formed. As a result, the sealer 79 in a liquid state before being cured is not unnecessarily spread. Furthermore, when a particle having a larger size than the size of the distance in the Z direction enters during the lamination of the lower structure 100a and the upper structure 100b, the distance after the lamination may be nonuniform. However, according to the present embodiment, the distance in the Z direction is increased at a periphery where a particle is particularly likely to enter. Accordingly, the distance after the lamination can be made to be uniform.

The second mirror 40 is not necessarily formed in a region where the spacers 77 are formed. Furthermore, neither the first mirror 30 nor the second mirror 40 is necessarily formed.

First Variation

Figure 12A:
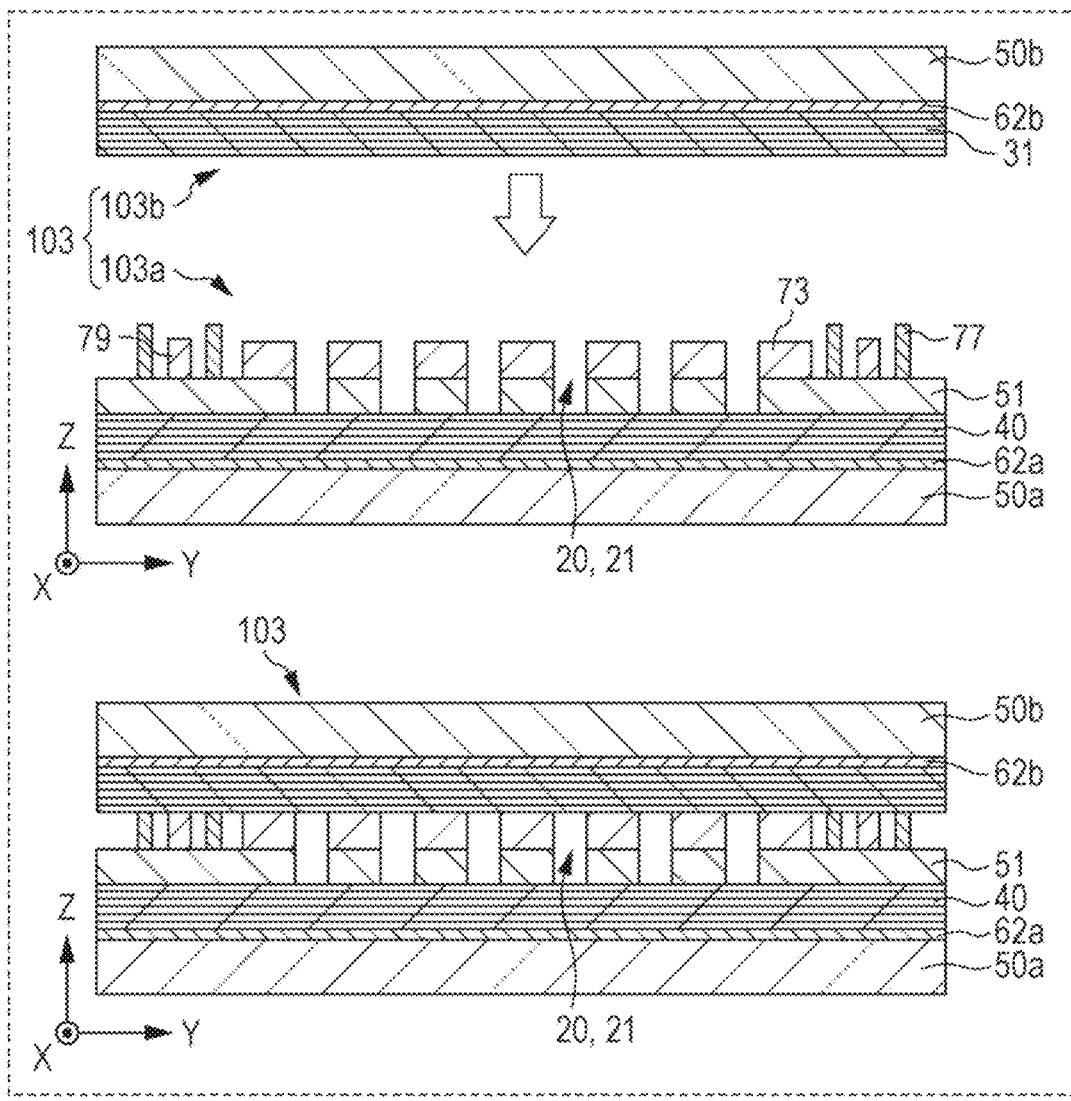
FIG. 12A illustrates a configuration of an optical scanning device according to a first variation.

FIG. 12A illustrates a configuration of an optical device 103 according to a first variation. FIG. 12A is a sectional view of the optical device 103 corresponding to a section taken along line XC-XC illustrated in FIG. 9 and illustrates configurations of a lower structure 103a and an upper structure 103b before and after lamination. According to the above-described embodiment, the first mirror 30 of the upper structure 100b is not formed in the region where the spacers 77 are formed. In contrast, according to the present variation, a mirror 31 is formed in the region where the spacers 77 are formed. Thus, stray light leaking from the optical waveguide layers 20 is confined by the mirror 31 and the mirror 40 and guided to an end portion of the substrate 50a. Accordingly, mixing of the stray light with the emission light from the optical device can be suppressed.

Second Variation

Figure 12B:
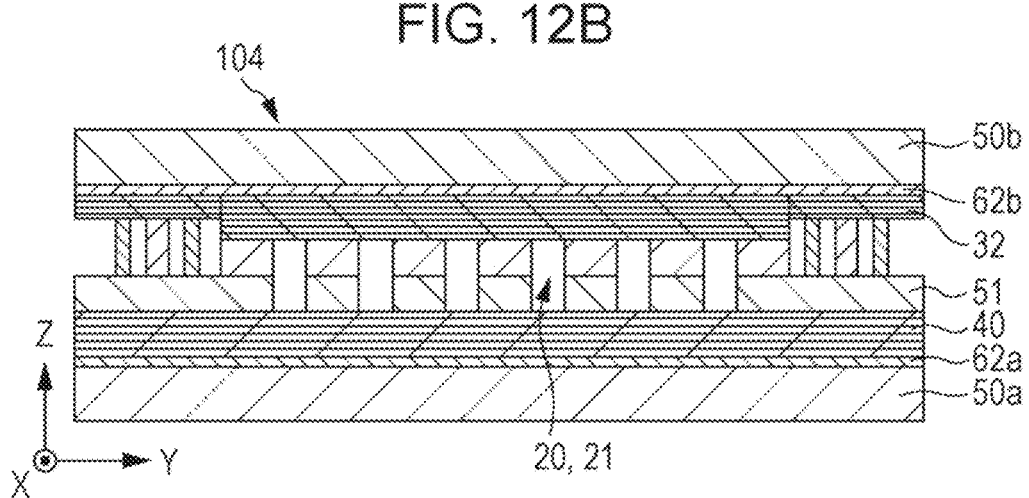
FIG. 12B illustrates a configuration of an optical scanning device according to a second variation.

FIG. 12B illustrates a configuration of an optical device 104 according to a second variation. According to the first variation, the mirror 31 is formed entirely on a surface of the substrate 50b. According to the present variation, the thickness of a mirror 32 is reduced in the region where the spacers 77 are formed compared to a region where the optical waveguide layers 20 are formed. The mirror 32 having a small thickness can be realized by, for example, reducing the number of layers of the multilayer reflection film. Such a configuration allows production of both the above-described effects, that is, the effect of reducing variation in the lamination caused by a particle and the effect of reducing the mixing of stray light into the emission light.

Next, results of measurement of light emitted from the optical device 100 according to the present embodiment are described.

Figure 13:
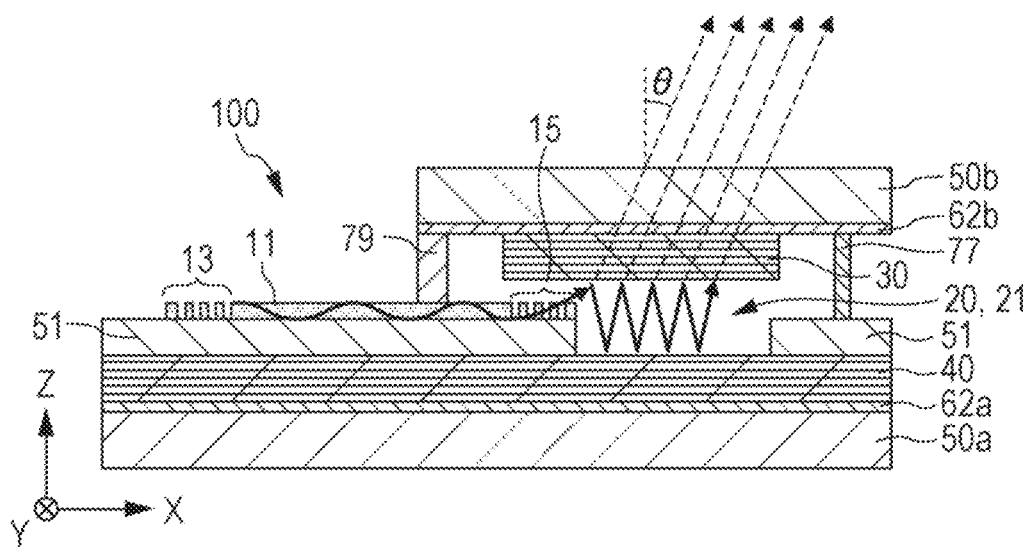
FIG. 13 schematically illustrates emission of light from the optical device.

FIG. 13 schematically illustrates emission of the light from the optical device 100. In an example illustrated in FIG. 13, the light emitted from the optical device 100 was measured by an optical detector (not illustrated) fixed in the direction of the emission angle θ=60°. In the measurement, laser light of 589 nm was input to the optical waveguides 11 through the gratings 13. It has been found that the intensity of the measured light is about 100 to 1000 times higher in the case where the one or more spacers 77 are provided than in the case where none of the one or more spacers 77 are provided. That is, with the optical device 100 according to the present embodiment, the intensity and accuracy of the emission angle of the emitted light can be significantly improved by the one or more spacers 77.

Applications

Figure 14:
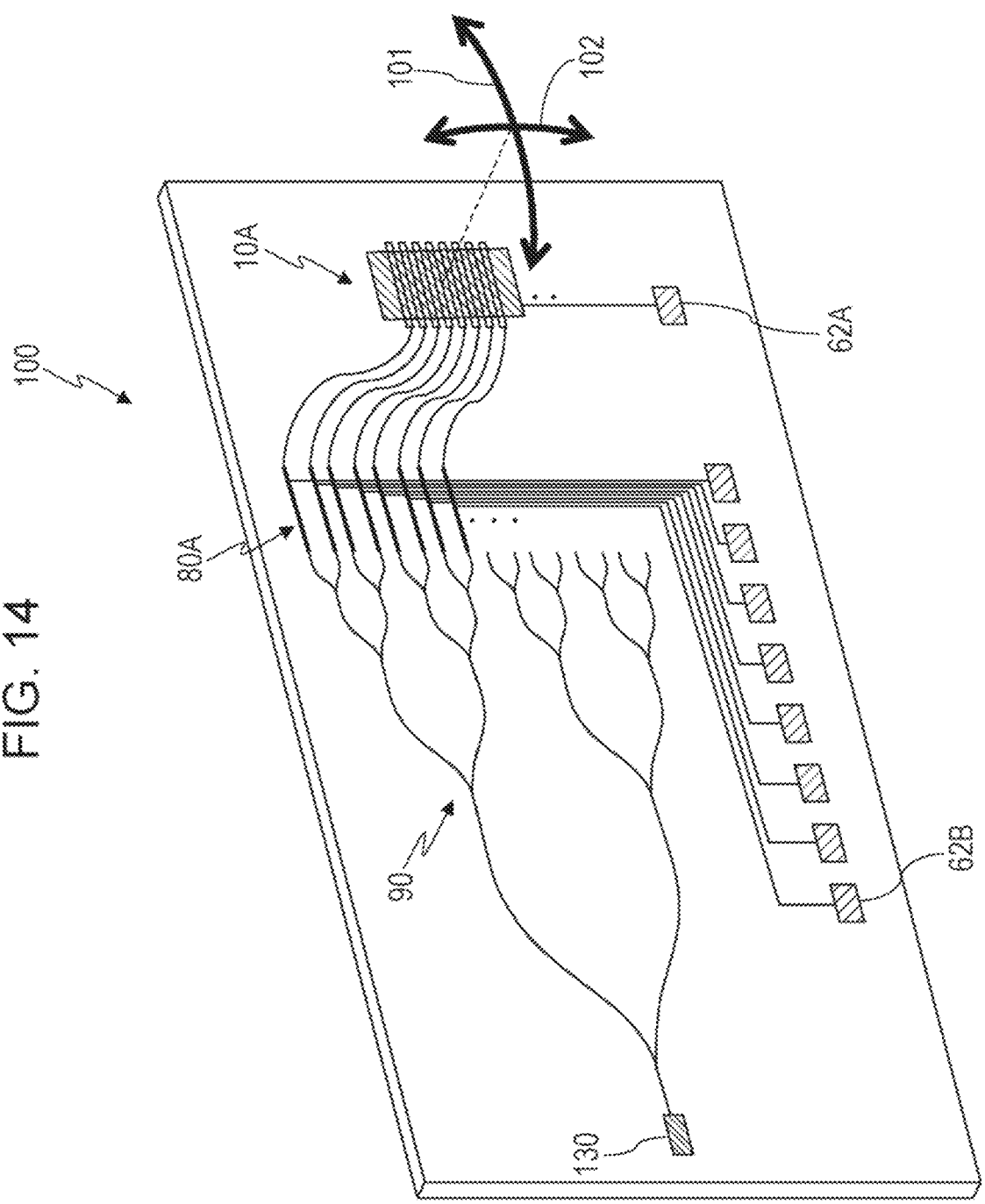
FIG. 14 illustrates an example of a configuration of the optical scanning device in which elements such as an optical branching device, the waveguide array, the phase shifter array, and a light source are integrated on a circuit substrate.

FIG. 14 illustrates an example of a configuration of the optical scanning device 100 in which elements such as the optical branching device 90, the waveguide array 10A, the phase shifter array 80A, and a light source 130 are integrated on a circuit substrate (for example, a chip). The light source 130 can be a light emitting element such as, for example, a semiconductor laser. The light source 130 of this example emits single-wavelength light the wavelength of which is λ in free space. The optical branching device 90 branches the light from the light source 130 so as to introduce the light into the waveguides of the plurality of phase shifters. An electrode 62A and a plurality of electrodes 62B are provided on the chip in the example illustrated in FIG. 14. A control signal is supplied from the electrode 62A to the waveguide array 10A. A control signal is transmitted from each of the plurality of electrodes 62B to a corresponding one of the plurality of phase shifters 80 of the phase shifter array 80A. The electrode 62A and the plurality of electrodes 62B can be connected to a control circuit (not illustrated) that generates the above-described control signals. The control circuit may be provided on the chip illustrated in FIG. 14 or another chip in the optical scanning device 100.

As illustrated in FIG. 14, a wide range of optical scanning can be realized with a size-reduced device by integrating all the components on the chip. For example, all the components illustrated in FIG. 14 can be integrated on a chip having a size of about 2 mm×1 mm.

Figure 15:
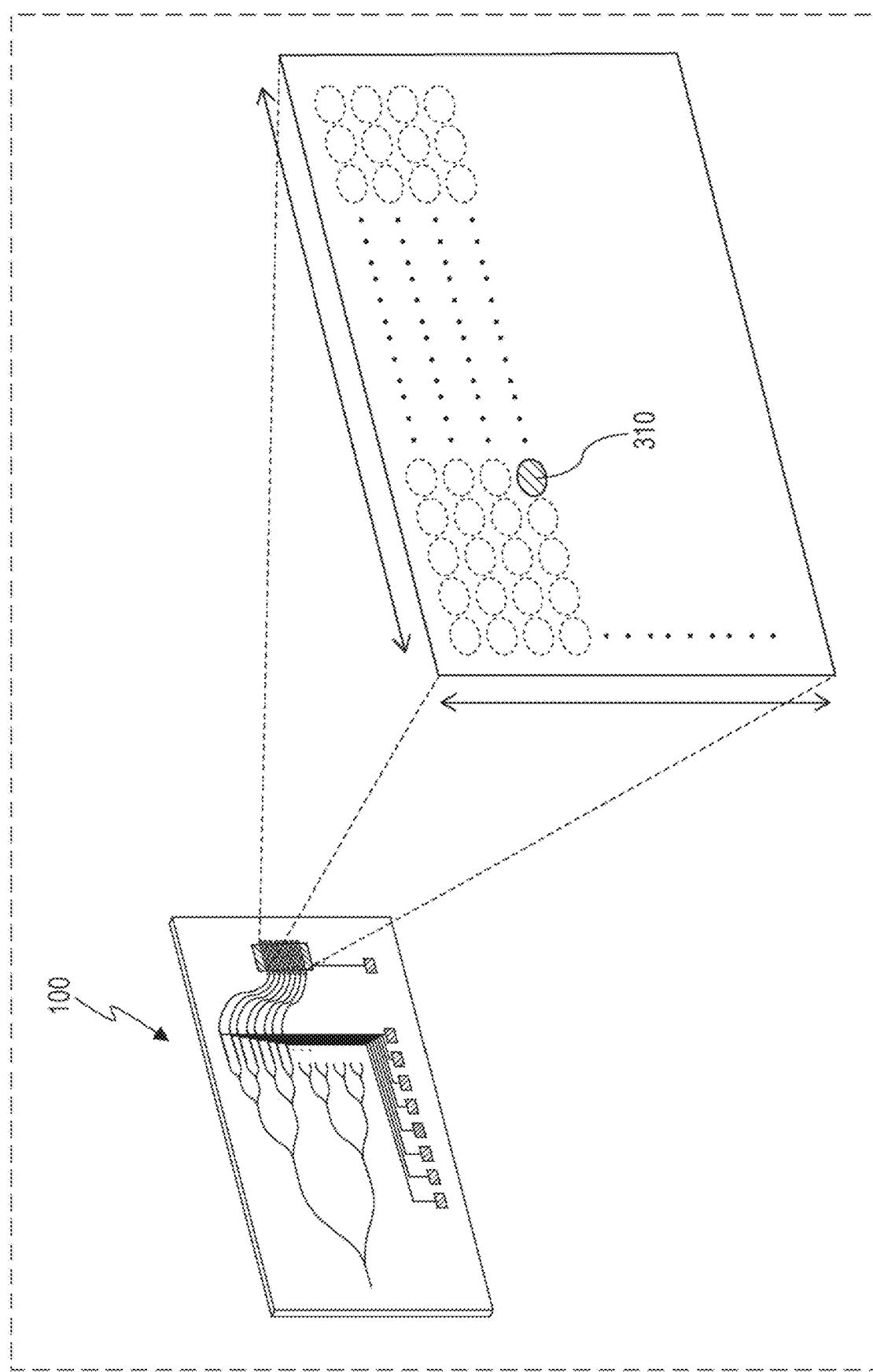
FIG. 15 is a schematic view illustrating how two-dimensional scanning is performed by radiating a light beam such as a laser beam from the optical scanning device to a point far from the optical scanning device.

FIG. 15 is a schematic view illustrating how two-dimensional scanning is performed by radiating a light beam such as a laser beam from the optical scanning device 100 to a point far from the optical scanning device 100. The two-dimensional scanning is performed by horizontally and vertically moving a beam spot 310. For example, when combined with a known time of flight (TOF) method, a two-dimensional ranging image can be obtained. In the TOF method, the time of flight of light is calculated by radiating a laser light and observing the light reflected from an object, thereby obtaining the distance.

Figure 16:
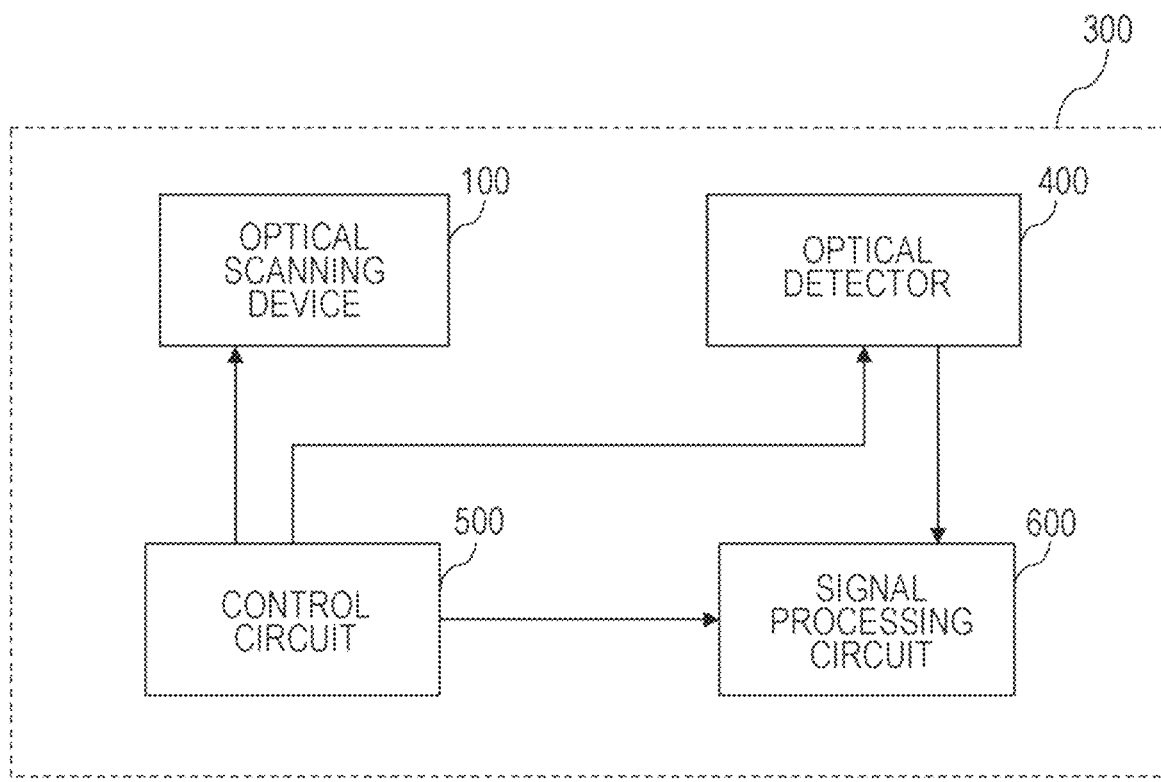
FIG. 16 is a block diagram illustrating an example of a configuration of a light detection and ranging (LiDAR) system that can generate a ranging image.

FIG. 16 is a block diagram illustrating an example of a configuration of a LiDAR system 300 serving as an example of the optical detection system that can generate such a ranging image. The LiDAR system 300 includes the optical scanning device 100, an optical detector 400, a signal processing circuit 600, and a control circuit 500. The optical detector 400 detects light emitted from the optical scanning device 100 and reflected by an object. For example, the optical detector 400 can be an image sensor having a sensitivity for the wavelength λ of the light emitted from the optical scanning device 100 or a photodetector including a photoreceiver such as a photodiode. The optical detector 400 outputs an electric signal corresponding to the amount of the received light. The signal processing circuit 600 calculates, based on the electric signals output from the optical detector 400, the distance to the object so as to generate distance distribution data. The distance distribution data is data indicative of a two-dimensional distribution of the distance (that is, a ranging image). The control circuit 500 is a processor that controls the optical scanning device 100, the optical detector 400, and the signal processing circuit 600. The control circuit 500 controls timing for radiation of a light beam from the optical scanning device 100 and timing for exposure to the light and signal reading of the optical detector 400 so as to instruct the signal processing circuit 600 to generate the ranging image.

For the two-dimensional scanning, as a frame rate for obtaining ranging images, a frame rate can be selected from among, for example, 60 fps, 50 fps, 30 fps, 25 fps, 24 fps, and so forth typically frequently used for moving images. Furthermore, in consideration of application in vehicle-mounted systems, as the frame rate increases, the frequency at which a ranging image is obtained is increased, thereby obstructions being detected with high accuracy. For example, when a vehicle is running at 60 km/h, with a frame rate of 60 fps, an image can be obtained every time the vehicle moves by 28 cm. With a frame rate of 120 fps, an image can be obtained every time the vehicle moves by 14 cm. With a frame rate of 180 fps, an image can be obtained every time the vehicle moves by 9.3 cm.

A period of time required to obtain a single ranging image depends on the speed of beam scanning. For example, for obtaining an image having 100×100 resolution points at 60 fps, beam scanning is required to be performed at shorter than or equal to 1.67 μs per point. In this case, the control circuit 500 controls emission of the light beam from the optical scanning device 100 and accumulation/reading of the signal by the optical detector 400 at an operating speed of 600 kHz.

An Example of Application for an Optical Reception Device

The optical scanning device according to the above-described embodiment of the present disclosure can also be used as an optical reception device with the configuration of the optical scanning device substantially unchanged. The optical reception device includes the same waveguide array 10A as that of the optical scanning device and the first adjustment element that adjusts the direction of light that can be received. Each of the first mirrors 30 of the waveguide array 10A transmits the light from the third direction and incident upon the opposite side to a first reflection surface. Each of the optical waveguide layers 20 of the waveguide array 10A causes the light having transmitted through the first mirror 30 to propagate therethrough in the second direction. The direction of the light that can be received can be changed when the first adjustment element changes at least one of the refractive index of the optical waveguide layer 20, the thickness of the optical waveguide layer 20, and the wavelength of the light in each of the waveguide elements 10. When the optical reception device also includes the plurality of phase shifters 80 that are the same as the plurality of phase shifters 80 of the optical scanning device or phase shifters 80a and 80b and the second adjustment element that changes the phase difference between portions of the light which pass from the plurality of waveguide elements 10 and the plurality of phase shifters 80 or 80a and 80b and which are output, the direction of the light that can be received can be changed in a two-dimensional manner.

For example, the optical reception device in which the light source 130 of the optical scanning device 100 illustrated in FIG. 14 is replaced with a reception circuit can be configured. When light of a wavelength of λ are incident to the waveguide array 10A, the light is transmitted to the optical branching device 90 through the phase shifter array 80A and finally gathered at a single position so as to be transmitted to the reception circuit. It can be said that the intensity of the light collected at this single position represents the sensitivity of the optical reception device. The sensitivity of the optical reception device can be adjusted with the adjustment elements separately incorporated in the waveguide array and the phase shifter array 80A. With the optical reception device, in, for example, FIG. 4, the direction of the wave vector (bold arrow in the drawing) is reversed. Incident light has a light component in a direction in which the waveguide elements 10 extend (X direction in the drawing) and a light component in a direction in which the waveguide elements 10 are arranged (Y direction in the drawing). The sensitivity of the light component in the X direction can be adjusted with the adjustment element incorporated in the waveguide array 10A. Meanwhile, the sensitivity of the light component in the arrangement direction of the waveguide elements 10 can be adjusted with the adjustment element incorporated in the phase shifter array 80A. θ and $\alpha_0$ illustrated in FIG. 4 can be obtained in accordance with the phase difference Δϕ of the light when the sensitivity of the optical reception device becomes the maximum and the refractive index $n_w$ and the thickness d of the optical waveguide layers 20. In this way, the incident direction of the light can be identified.

Accordingly, with reference to the example illustrated in FIGS. 11A to 11C, the configuration and operation of the optical device 100 according to the present embodiment as the optical scanning device or the optical reception device are summarized as follows.

In the optical device 100 according to the present embodiment, the one or more dielectric members 21 include a liquid crystal material or an electrooptic material. The one or more dielectric members 21 are sandwiched between the pair of electrodes 62a and 62b for application of voltage. That is, the one or more first optical waveguides 10 include a structure that allows adjustment of a refractive index of the one or more dielectric members 21.

When the optical device 100 according to the present embodiment is used as the optical scanning device, the direction of the light emitted from the one or more optical waveguides 10 through the substrate 50a or substrate 50b is changed by adjusting the refractive index of the one or more dielectric members 21. More specifically, the X-direction component of the wave vector of the light is changed.

When the optical device 100 according to the present embodiment is used as the optical reception device, the incident direction of light input to the one or more optical waveguides 10 through the substrate 50a or substrate 50b is changed by adjusting the refractive index of the one or more dielectric members 21. More specifically, the X-direction component of the wave vector of the light is changed.

The optical device 100 according to the present embodiment may further include one or more phase shifters 80 respectively connected to the one or more optical waveguides 10 directly or through one or more of other optical waveguides.

When the optical device 100 according to the present embodiment is used as the optical scanning device, the direction of light emitted from the one or more optical waveguides 10 through the substrate 50a or substrate 50b is changed by changing the phase difference between the portions of the light passing through the one or more phase shifters 80. More specifically, the Y-direction component of the wave vector of the light is changed.

When the optical device 100 according to the present embodiment is used as the optical reception device, the incident direction for input to the one or more optical waveguides 10 through the substrate 50a or substrate 50b is changed by changing the phase difference between the portions of light passing through the one or more phase shifters 80. More specifically, the Y-direction component of the wave vector of the light is changed.

The elements of the above-described embodiment can be appropriately combined.

The optical scanning device and the optical reception device according to the embodiment of the present disclosure can be utilized for applications including, for example, a LiDAR system and the like mounted on automobiles, UAVs, AGVs, and the like.

What is claimed is:

1. An optical device comprising:
    a first substrate that has a surface which extends in a first direction and a second direction intersecting the first direction;
    a second substrate that faces the first substrate;
    a plurality of separation walls that are positioned between the first substrate and the second substrate and that extend in the first direction;
    one or more first optical waveguides that are positioned between the first substrate and the second substrate; and
    one or more spacers that are directly or indirectly sandwiched between the first substrate and the second substrate, that support the first substrate or the second substrate, and that are positioned around the one or more first optical waveguides,
    wherein the plurality of separation walls include a different material from the first substrate, and
    wherein a modulus of elasticity of each of the one or more spacers is smaller than a modulus of elasticity of any one of the plurality of separation walls.

2. The optical device according to claim 1, wherein the plurality of separation walls are directly or indirectly sandwiched between the first substrate and the second substrate, and wherein,
    a deformation ratio of each of the one or more spacers in a direction perpendicular to the surface of the first substrate due to being sandwiched between the first substrate and the second substrate is greater than a deformation ratio of any one of the plurality of separation walls in the direction perpendicular to the surface of the first substrate.

3. The optical device according to claim 1, wherein the one or more spacers include a plurality of columnar spacers.

4. The optical device according to claim 1, further comprising:
    a sealer that fixes a distance between the first substrate and the second substrate, wherein
    the sealer encloses the one or more first optical waveguides and the plurality of separation walls when seen in a direction perpendicular to the surface of the first substrate.

5. The optical device according to claim 4, wherein:
    the one or more first optical waveguides include one or more dielectric members which are positioned between the plurality of separation walls and which extend in the first direction, and
    a region that is positioned between the first substrate and the second substrate and that is enclosed by the sealer is filled with a member which is identical to the one or more dielectric members.

6. The optical device according to claim 4, wherein the one or more spacers are positioned inside and/or outside a region enclosed by the sealer.

7. The optical device according to claim 1, further comprising:
    one or more second optical waveguides respectively connected to the one or more first optical waveguides.

8. The optical device according to claim 7, wherein the one or more first optical waveguides include a plurality of the first optical waveguides,
    the one or more second optical waveguides include a plurality of the second optical waveguides, and wherein
    the one or more spacers include at least one spacer provided between two of the plurality of second optical waveguides adjacent to each other.

9. The optical device according to claim 7, further comprising:
a dielectric layer positioned between the first substrate and the one or more second optical waveguides.

10. The optical device according to claim 7, wherein
each of the one or more second optical waveguides includes a corresponding one of portions positioned between two of the plurality of separation walls adjacent to each other, and wherein
the second optical waveguide includes a first grating in the portion positioned between the two of the separation walls adjacent to each other.

11. The optical device according to claim 7, wherein,
each of the one or more second optical waveguides includes a corresponding one of portions that is not superposed, when seen in a direction perpendicular to the surface of the first substrate, on one of the first substrate and the second substrate, and wherein
the second optical waveguide includes a second grating in the portion that is not superposed on one of the first substrate and the second substrate.

12. The optical device according to claim 1, further comprising:
one or more dielectric members, wherein the one or more dielectric members which are positioned between the plurality of separation walls are included in the one or more first optical waveguides, and extend in the first direction; and
two mirrors respectively positioned between the first substrate and the one or more dielectric members and between the second substrate and the one or more dielectric members.

13. The optical device according to claim 12, wherein,
when seen in a direction perpendicular to the surface of the first substrate, at least one of the two mirrors is not formed in a region where the one or more spacers are provided.

14. The optical device according to claim 1, wherein:
the one or more first optical waveguides include one or more dielectric members which are positioned between the plurality of separation walls and which extend in the first direction,
the one or more first optical waveguides include a structure that allows adjustment of a refractive index of the one or more dielectric members, and
when the refractive index of the one or more dielectric members is adjusted, a direction of light emitted from the one or more first optical waveguides through the first substrate or the second substrate or an incident direction of light input to the one or more first optical waveguides through the first substrate or the second substrate is changed.

15. The optical device according to claim 14, further comprising:
one or more dielectric members, wherein the one or more dielectric members which are positioned between the plurality of separation walls are included in the one or more first optical waveguides, and extend in the first direction; and
a pair of electrodes between which the one or more dielectric members are sandwiched, wherein:
the one or more dielectric members include a liquid crystal material or an electrooptic material, and
when a voltage is applied to the pair of electrodes, the refractive index of the one or more dielectric members is adjusted.

16. The optical device according to claim 15, further comprising:
one or more phase shifters respectively connected to the one or more optical waveguides directly or through one or more other optical waveguides, wherein
when a phase difference between portions of light respectively passing through the one or more phase shifters is changed, the direction of the light emitted from the one or more first optical waveguides through the first substrate or the second substrate or the incident direction of the light input to the one or more first optical waveguides through the first substrate or the second substrate is changed.

17. An optical detection system comprising:
the optical device according to claim 1;
an optical detector that detects light emitted from the optical device and reflected by an object; and
a signal processor that generates distance distribution data based on output of the optical detector.

18. An optical device comprising:
a first substrate that has a surface which extends in a first direction and a second direction intersecting the first direction;
a second substrate that faces the first substrate;
a plurality of separation walls that are positioned between the first substrate and the second substrate and that extend in the first direction;
one or more first optical waveguides that are positioned between the first substrate and the second substrate; and
one or more spacers that are directly or indirectly sandwiched between the first substrate and the second substrate, that support the first substrate or the second substrate, and that are positioned around the one or more first optical waveguides,
wherein the plurality of separation walls include a different material from the first substrate,
wherein a modulus of elasticity of each of the one or more spacers is smaller than a modulus of elasticity of any one of the plurality of separation walls, and
wherein each of the plurality of separation walls and each of the one or more spacers are not in direct contact with each other.

19. An optical device comprising:
a first substrate that has a surface which extends in a first direction and a second direction intersecting the first direction;
a second substrate that faces the first substrate;
a plurality of separation walls that are positioned between the first substrate and the second substrate and that extend in the first direction;
one or more first optical waveguides that are positioned between the first substrate and the second substrate; and
one or more spacers that are directly or indirectly sandwiched between the first substrate and the second substrate, that support the first substrate or the second substrate, and that are positioned around the one or more first optical waveguides,
wherein the plurality of separation walls include a different material from the first substrate,
wherein a modulus of elasticity of each of the one or more spacers is smaller than a modulus of elasticity of any one of the plurality of separation walls, and
wherein the first direction and the second direction forms a plane, and a dimension of each of the one or more spacers in the direction perpendicular to the plane is greater than a dimension of each of the plurality of the separation walls in the direction perpendicular to the plane.

20. An optical device comprising:
a first substrate that has a surface which extends in a first direction and a second direction intersecting the first direction;
a second substrate that faces the first substrate;
a plurality of separation walls that are positioned between the first substrate and the second substrate and that extend in the first direction;
one or more first optical waveguides that are positioned between the first substrate and the second substrate; and
one or more spacers that are directly or indirectly sandwiched between the first substrate and the second substrate, that support the first substrate or the second substrate, and that are positioned around the one or more first optical waveguides,
wherein a modulus of elasticity of each of the one or more spacers is smaller than a modulus of elasticity of any one of the plurality of separation walls, and
wherein the first direction and the second direction forms a plane, and a dimension of each of the one or more spacers in the direction perpendicular to the plane is greater than a dimension of each of the plurality of the separation walls in the direction perpendicular to the plane.

* * * * *